(12) United States Patent
Yanai et al.

(10) Patent No.: US 8,694,613 B2
(45) Date of Patent: Apr. 8, 2014

(54) CLIENT DEVICE, INFORMATION PROCESSING METHOD, AND INFORMATION PROCESSING SYSTEM

(75) Inventors: Shin Yanai, Tokyo (JP); Tohru Kurata, Tokyo (JP); Hiroki Kato, Kanagawa (JP); Masayuki Ebisawa, Chiba (JP); Tatsuya Koeda, Tokyo (JP); Hideaki Nishino, Los Angeles, CA (US)

(73) Assignees: Sony Corporation, Tokyo (JP); Sony Corporation of America, New York, NY (US)

( * ) Notice: Subject to any disclaimer, the term of this patent is extended or adjusted under 35 U.S.C. 154(b) by 209 days.

(21) Appl. No.: 13/212,285

(22) Filed: Aug. 18, 2011

(65) Prior Publication Data

US 2012/0131148 A1 May 24, 2012

Related U.S. Application Data

(60) Provisional application No. 61/416,162, filed on Nov. 22, 2010.

(51) Int. Cl.
*G06F 15/16* (2006.01)
(52) U.S. Cl.
USPC .......................... 709/219; 709/231; 707/899
(58) Field of Classification Search
USPC ................ 709/217, 219, 231, 200; 707/600
See application file for complete search history.

(56) References Cited

U.S. PATENT DOCUMENTS

| 2002/0120577 A1 | 8/2002 | Hans et al. |
| 2009/0327305 A1 | 12/2009 | Roberts et al. |
| 2009/0327450 A1 | 12/2009 | Alkove et al. |
| 2012/0110099 A1* | 5/2012 | Fujihara et al. ............... 709/206 |

FOREIGN PATENT DOCUMENTS

JP 2006-85479 3/2006

OTHER PUBLICATIONS

Extended European Search Report issued Feb. 16, 2012, in Patent Application No. 11188920.0.

* cited by examiner

*Primary Examiner* — El Hadji Sall
(74) *Attorney, Agent, or Firm* — Oblon, Spivak, McClelland, Maier & Neustadt, L.L.P.

(57) ABSTRACT

There is provided a client device including a storage section which stores content data, a control section which acquires content identification information for identifying the content data stored in the storage section, and a transmission section which transmits, to a server device, a registration request including user identification information for identifying a user who uses the client device and the content identification information acquired by the control section, and which, when the server device holds the content data identified by the content identification information, causes the server device to hold information obtained by associating the user identification information with the content identification information as user-specific registration information.

16 Claims, 20 Drawing Sheets

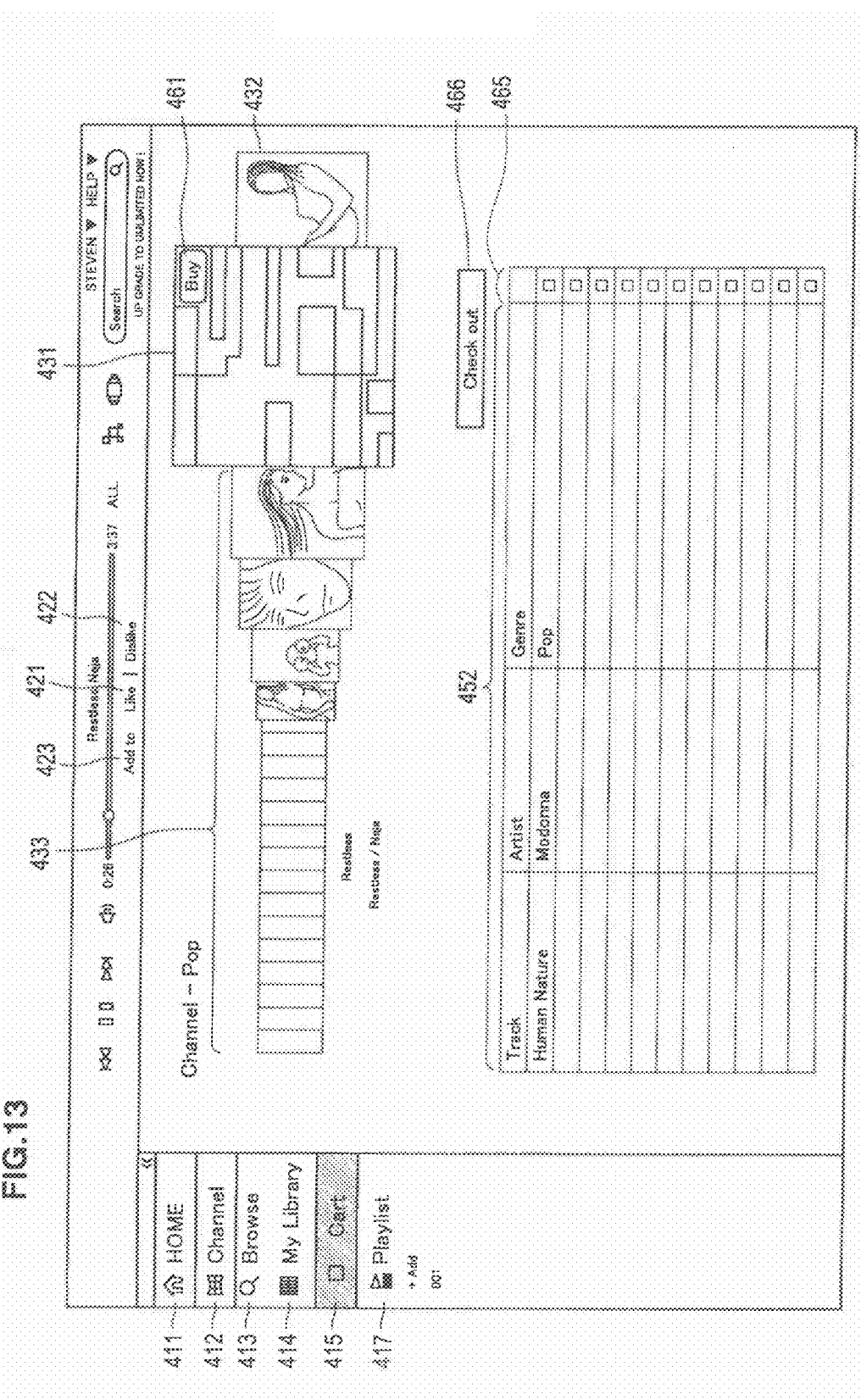

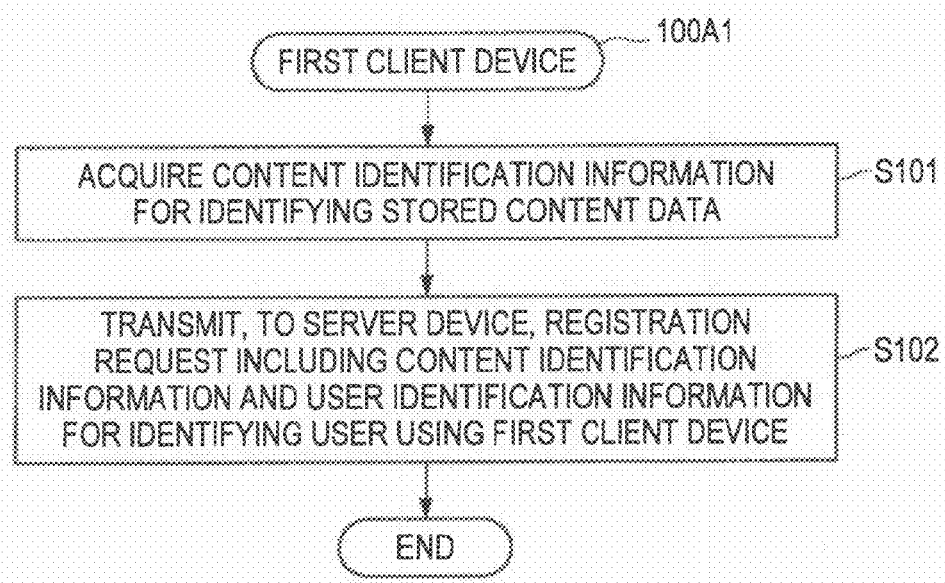

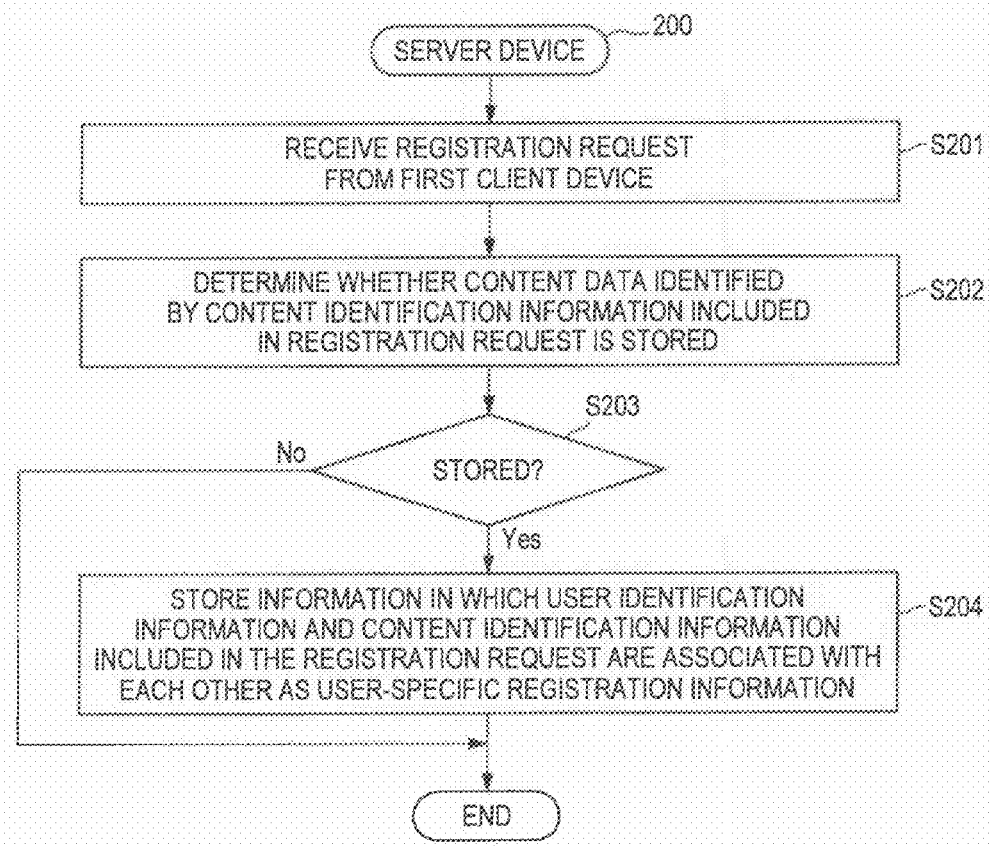

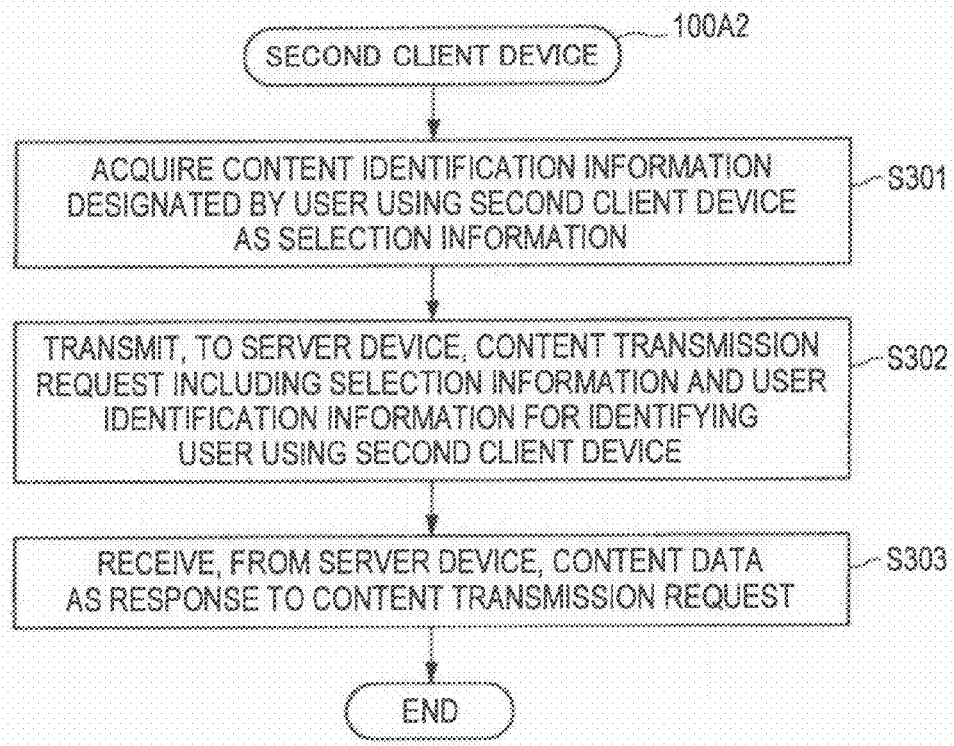

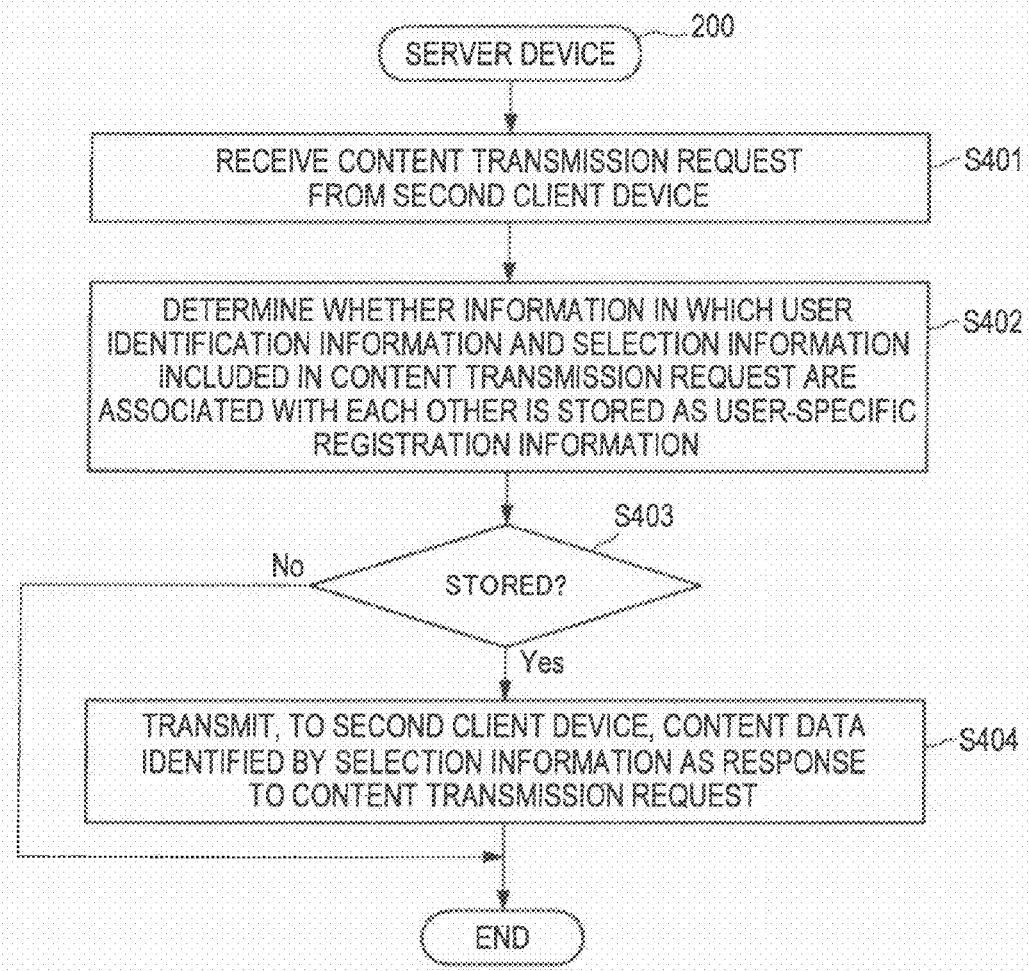

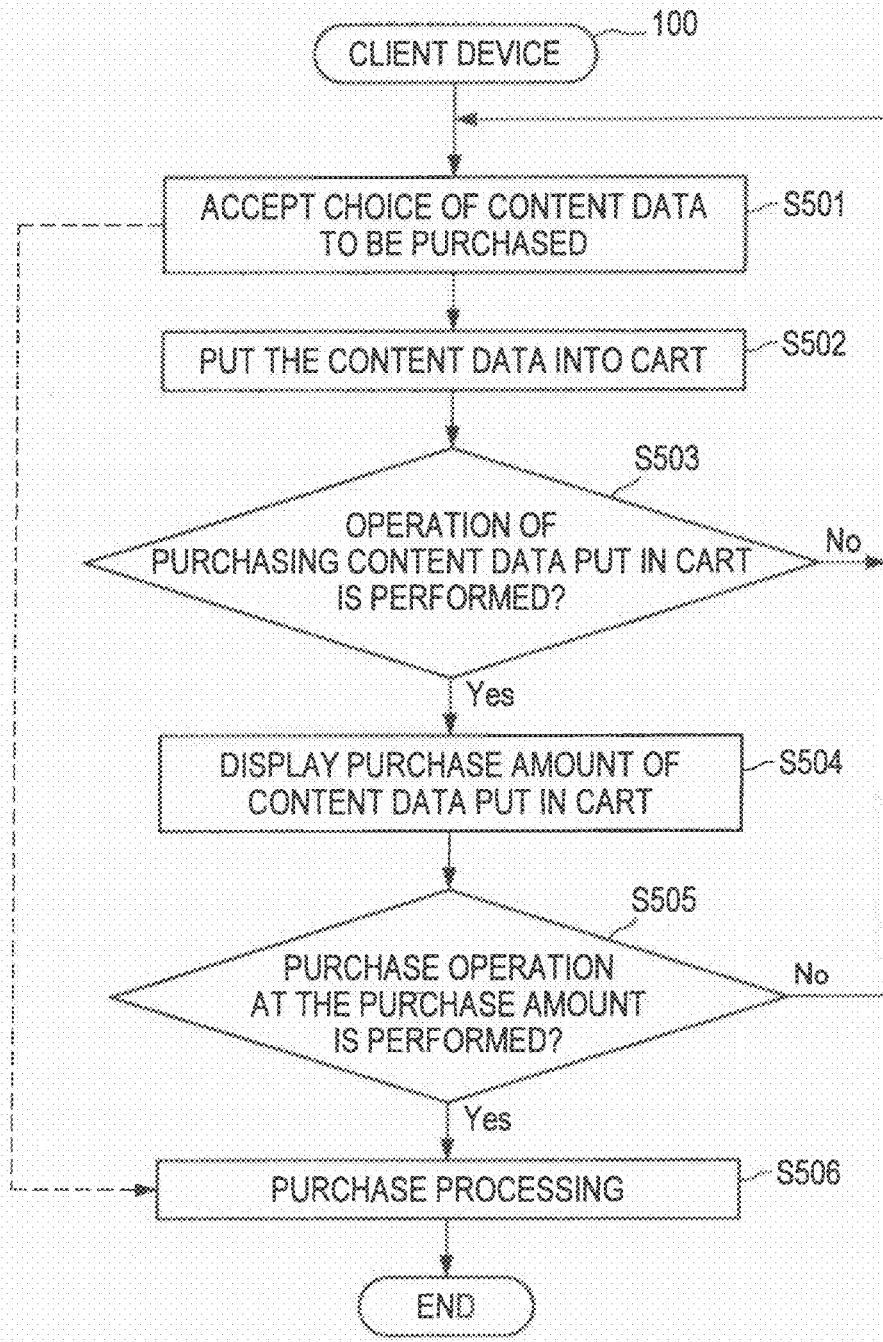

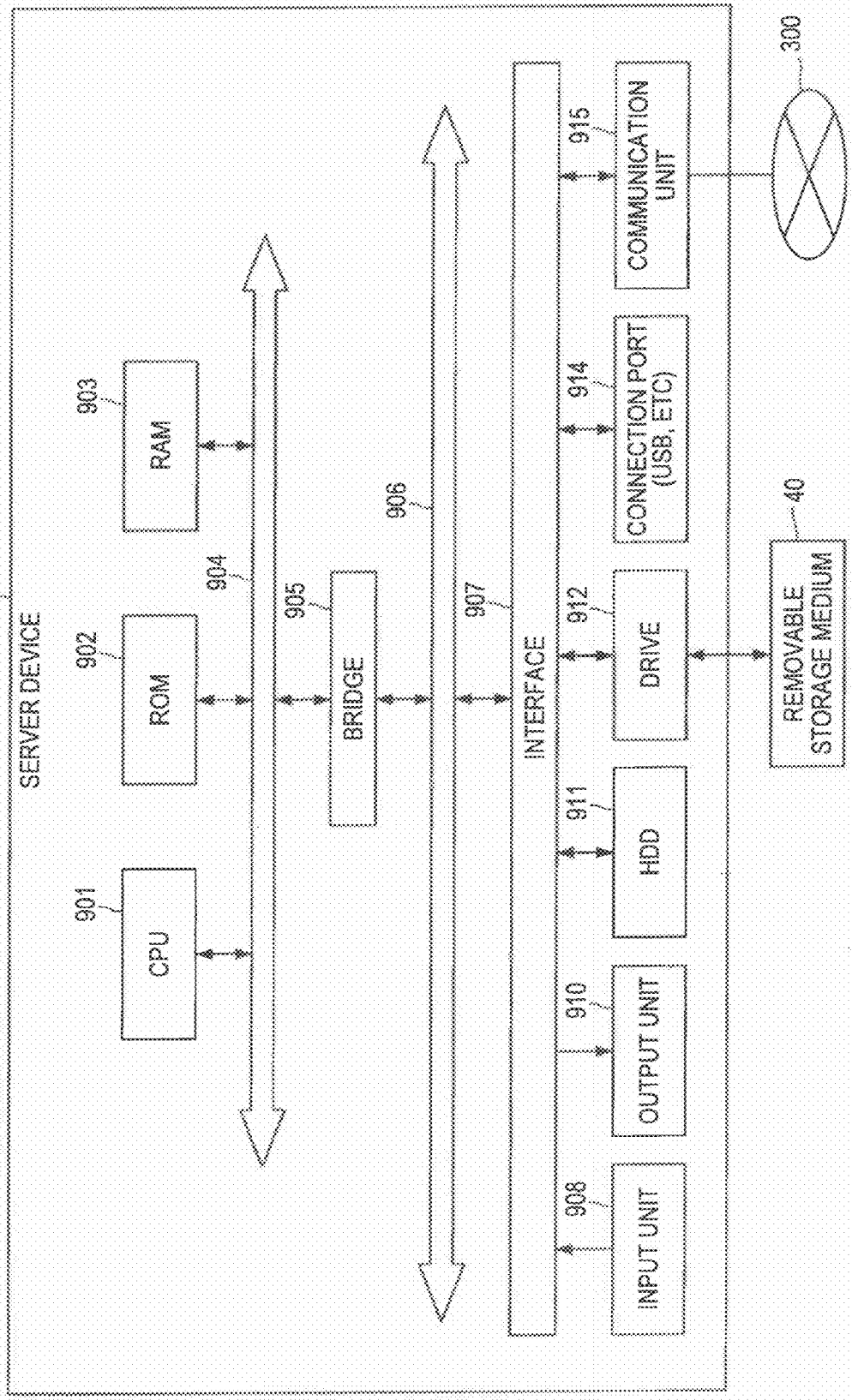

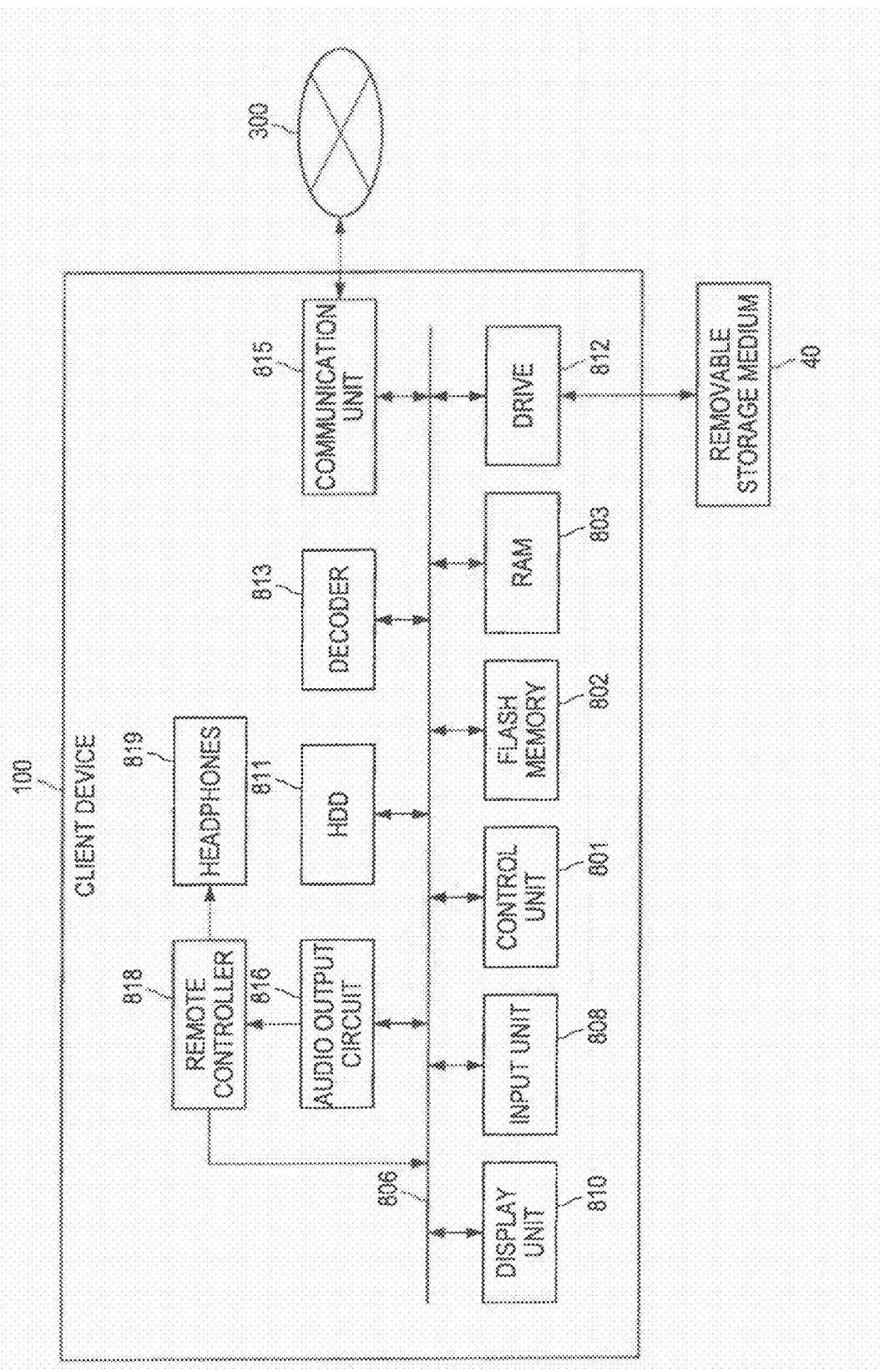

CLIENT DEVICE, INFORMATION PROCESSING METHOD, AND INFORMATION PROCESSING SYSTEM

CROSS-REFERENCE TO RELATED APPLICATION

This application claims priority from U.S. Provisional Patent Application Ser. No. 61/416,162 filed Nov. 22, 2010

BACKGROUND OF THE INVENTION

1. Field of the Invention

The present invention relates to a client device, an information processing method, and an information processing system.

2. Description of the Related Art

In recent years, a client/server system in which a role played by a computer is shared between a client device and a server device has been utilized in various scenes. In the client/server system, in general, a user views a screen of the client device and inputs a desired instruction to the client device, and the client device transmits a request corresponding to the instruction input from the user to the server device. The server device receives the request transmitted from the client device, executes operation corresponding to the request, and sends back, as a response to the request, a result obtained by the execution to the client device.

Between the client device and the server device, various pieces of information may be transmitted to and received from each other. For example, there is generally known a client/server system in which, when a content data-transmission request is transmitted from the client device to the server device, content data held by the server device is transmitted to the client device as a response to the transmission request (for example, refer to JP-A-2006-85479).

SUMMARY OF THE INVENTION

However, with the spread of information and telecommunications equipment, the number of scenes is increasing that a user owns multiple client devices and wants to use the same content data by each of the multiple client devices, for example. The content data can be used by performing various types of processing, for example, by reproducing the content data or by displaying the content data. For example, there is assumed a scene where the user tries to use, by a second client device, the same content data as content data which has been used by a first client device.

In such a scene, in the case where the general client/server system as described above is used, it is necessary that the user perform operation for uploading content data used by the first client device from the first client device to the server device. After that, when the uploading of the content data is completed, the user performs operation for downloading the content data, which has been uploaded to the server device, to the second client device. As a result of the operation, it becomes possible for the user to use, by the second client device, the downloaded content data.

As described above, it is necessary that, before using, by the second client device, the content data which has been used by the first client device, the user perform the operation for uploading the content data from the first client device to the server device. Therefore, there was an issue that it took time and effort for the user to perform the operation.

In light of the foregoing, it is desirable to provide a novel and improved technology which is capable of, in order to use the content data, which can be used by the first client device, by the second client device, reducing the time and effort to upload the content data from the first client device to the server device.

According to an embodiment of the present invention, there is provided a client device which includes a storage section which stores content data, a control section which acquires content identification information for identifying the content data stored in the storage section, and a transmission section which transmits, to a server device, a registration request including user identification information for identifying a user who uses the client device and the content identification information acquired by the control section, and which, when the server device holds the content data identified by the content identification information, causes the server device to hold information obtained by associating the user identification information with the content identification information as user-specific registration information.

When the server device does not hold the content data identified by the content identification information, the transmission section may cause the server device to be prohibited from holding the user-specific registration information.

When the server device does not hold the content data identified by the content identification information, the transmission section may cause the server device to hold the user-specific registration information, and may also transmit the content data stored in the storage section to the server device and may cause the server device to hold the content data.

The storage section may further store a playlist obtained by arranging a plurality of pieces of content identification information in reproduction order. The control section may acquire the playlist stored in the storage section. The transmission section may further transmit the playlist to the server device, and may cause the server device to hold a list, which is obtained by eliminating the content identification information that is not included in the user-specific registration information from the playlist, in association with the user identification information.

The storage section may further store a playlist obtained by arranging a plurality of pieces of content identification information in reproduction order. The control section may acquire the playlist stored in the storage section. The transmission section may further transmit the playlist to the server device, and may cause the server device to hold the playlist in association with the user identification information.

According to another embodiment of the present invention, there is provided a client device which includes a control section which acquires content identification information designated by a user who uses the client device as selection information, a transmission section which transmits, to a server device, a content transmission request including user identification information for identifying the user and the selection information acquired by the control section, and which, when the server device holds information obtained by associating the user identification information with the selection information as user-specific registration information, causes the server device to execute transmission of content data identified by the selection information as a response to the content transmission request, and a reception section which receives the content data transmitted from the server device.

When the selection information is not held, as the content identification information, by the server device in association with the user identification information, the transmission section may cause the server device to be prohibited from transmitting the content data identified by the selection information.

The client device may further include a storage section which stores content data. The control section may acquire content identification information for identifying the content data stored in the storage section. The transmission section may transmit, to the server device, a registration request including the user identification information and the content identification information acquired by the control section, and when the server device holds the content data identified by the content identification information, the transmission section may cause the server device to hold information obtained by associating the user identification information with the content identification information as the user-specific registration information.

The transmission section may transmit, to the server device, a registration request including the user identification information and the content identification information acquired by the control section, and when the server device holds the content data identified by the content identification information, the transmission section may cause the server device to continuously hold the user-specific registration information, which has already been held by the server device, and may also cause the server device to add information obtained by associating the user identification information with the content identification information to the user-specific registration information.

The transmission section may transmit, to the server device, an information transmission request which is a request for acquiring content-related information, which is information related to content data held by the server device. The client device may further include a reception section which receives, from the server device, the content-related information as a response to the information transmission request. The control section may cause a predetermined display section to display the content-related information received by the reception section from the server device.

The transmission section may transmit, to the server device, user identification information for identifying a user who uses the client device by including the user identification information in the information transmission request. When, in the content-related information received by the reception section from the server device, there is included information indicating that the content identification information is not registered in the user-specific registration information in association with the user identification information included in the information transmission request, the control section may cause the predetermined display section to display the content-related information, and may also cause the predetermined display section to display a predetermined object for causing the user to purchase the content data identified by the content identification information, in a corresponding manner to the content-related information.

The transmission section may transmit, to the server device, a registration information acquisition request including user identification information for identifying a user who uses the client device. The client device may further include a reception section which receives content-related information as a response to the registration information acquisition request from the server device, the content-related information being information related to content data identified by the content identification information which is held by the server device in association with the user identification information in the user-specific registration information. The control section may cause a predetermined display section to display the content-related information received by the reception section from the server device.

The reception section may further receive content-related information as a response to the registration information acquisition request from the server device, the content-related information being information related to content data identified by the content identification information which is not held by the server device in association with the user identification information in the user-specific registration information. The control section may cause the predetermined display section to display the content related information, and may also cause the predetermined display section to display a predetermined object for causing the user to purchase the content data identified by the content identification information, in a corresponding manner to the content-related information.

According to the embodiments of the present invention described above, it is possible, in order to use the content data, which can be used by a first client device, by a second client device, to reduce the time and effort to upload the content data from the first client device to the server device.

BRIEF DESCRIPTION OF THE DRAWINGS

FIG. 13 is a diagram showing a display example of content data which is to be purchased by the user via the client device according to the embodiment of the present invention;

FIG. 14 is an example of a flowchart showing a flow of processing executed by the first client device according to the embodiment of the present invention;

FIG. 15 is an example of a flowchart showing a flow of processing (i) executed by the server device according to the embodiment of the present invention;

FIG. 16 is an example of a flowchart showing a flow of processing executed by the second client device according to the embodiment of the present invention;

FIG. 17 is an example of a flowchart showing a flow of processing (ii) executed by the server device according to the embodiment of the present invention;

FIG. 18 is an example of a flowchart showing a flow of content data-purchase processing executed by the client device according to the embodiment of the present invention;

FIG. 19 is an example of a hardware configuration of the server device according to the embodiment of the present invention; and FIG. 20 is an example of a hardware configuration of the client device according to the embodiment of the present invention.

DETAILED DESCRIPTION OF THE EMBODIMENTS

Figure 1:
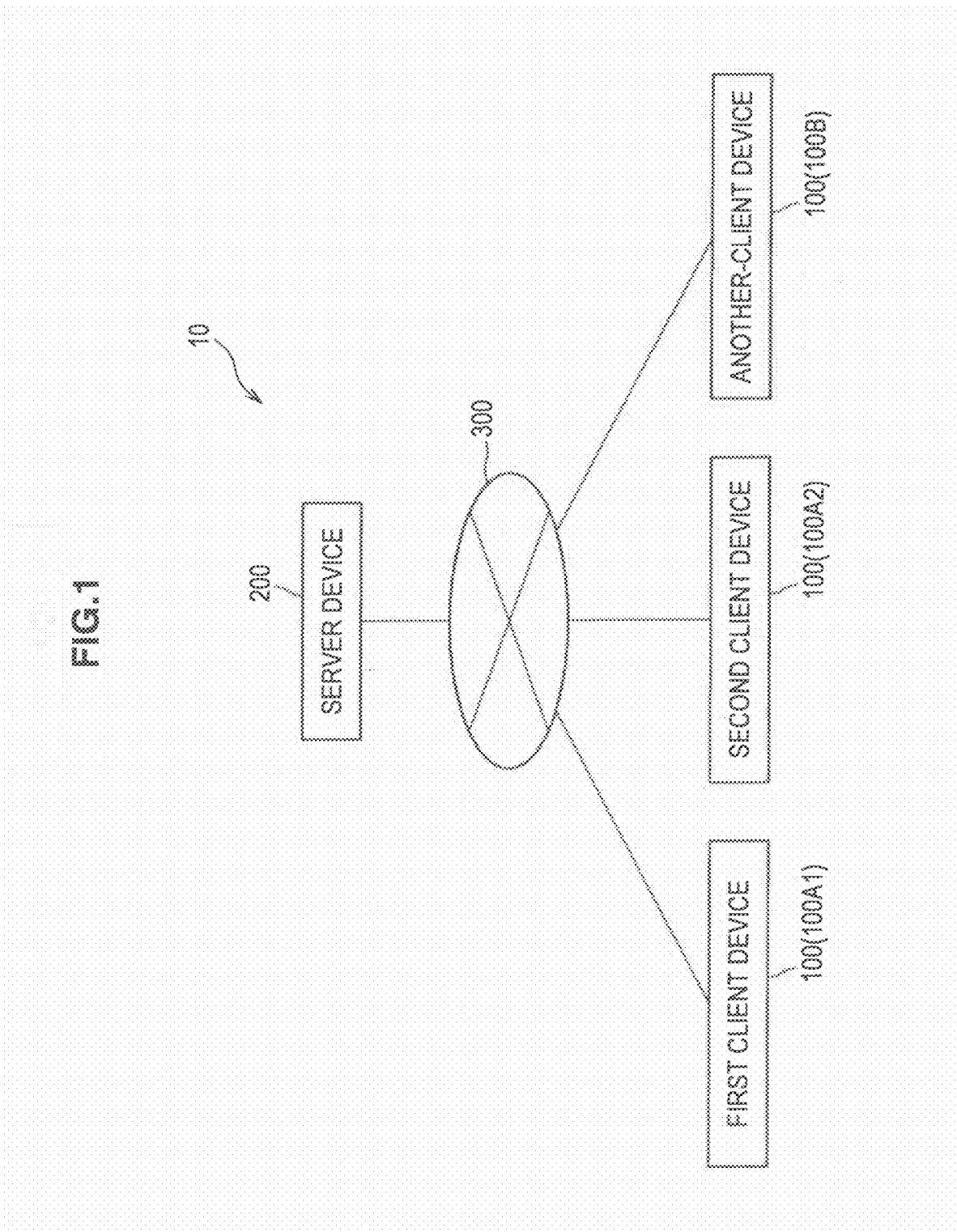
FIG. 1 is a diagram showing a configuration of an information processing system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Further, the "detailed description of the embodiments" will be described in the following order.

1. Embodiment
1-1. Configuration of information processing system
1-2. Processing for using content data by another-client device
1-3. Examples of various types of information held by first client device
1-4. Processing for registering content identification information by first client device
1-5. Processing for registering playlist by first client device
1-6. Processing for using content data by second client device
1-7. Functional configuration of first client device
1-8. Functional configuration of server device
1-9. Functional configuration of second client device
1-10. Display example of information related to content data
1-11. Screen example (i) for causing user to purchase content data
1-12. Screen example (ii) for causing user to purchase content data
1-13. Display example of content data to be purchased by user
1-14. Processing executed by first client device
1-15. Processing (i) executed by server device
1-16. Processing executed by second client device
1-17. Processing (ii) executed by server device
1-18. Content data-purchase processing executed by client device
1-19. Example of hardware configuration of server device
1-20. Example of hardware configuration of client device
2. Modified example
3. Summary <1. Embodiment>
[1-1. Configuration of Information Processing System]

FIG. 1 is a diagram showing a configuration of an information processing system according to an embodiment of the present invention. With reference to FIG. 1, the configuration of the information processing system according to the embodiment of the present invention will be described.

As shown in FIG. 1, an information processing system 10 according to the embodiment of the present invention includes at least a first client device 100A1 as an example of a client device 100, a second client device 100A2 as an example of the client device 100, and a server device 200. The first client device 100A1 and the server device 200 are rendered communicable with each other via a network 300. In the same manner, the second client device 100A2 as an example of the client device 100 and the server device 200 are rendered communicable with each other via a network 300.

The first client device 100A1 and the second client device 100A2 are used by a same user (hereinafter, referred to as "user A"). Note that, a description will be continued assuming that the number of the client devices 100 used by the user A here are two, the first client device 100A1 and the second client device 100A2, but the number of the client devices 100 used by the user A is not limited to two and may be any as long as the number is two or more.

Further, in the embodiment of the present invention, the information processing system 10 includes an another-client device 100B as an example of the client device 100. The another-client device 100B is used by a user other than the user A (hereinafter, referred to as "user B"), and the another-client device 100B and the server device 200 are rendered communicable with each other via a network 300 in the same manner. However, the information processing system 10 may not include the another-client device 100B.

In general, it is necessary that before using, by the second client device 100A2, content data which has been used by the first client device 100A1, the user A perform operation for uploading the content data from the first client device 100A1 to the server device 200. Therefore, it is general that it takes time and effort for the user A to perform the operation. In the embodiment of the present invention, a detailed description will be made on technology which is capable of, in order to use the content data, which can be used by the first client device 100A1, by the second client device 100A2, reducing the time and effort to upload the content data from the first client device 100A1 to the server device 200.

[1-2. Processing for Using Content Data by Another-Client Device]

Figure 2:
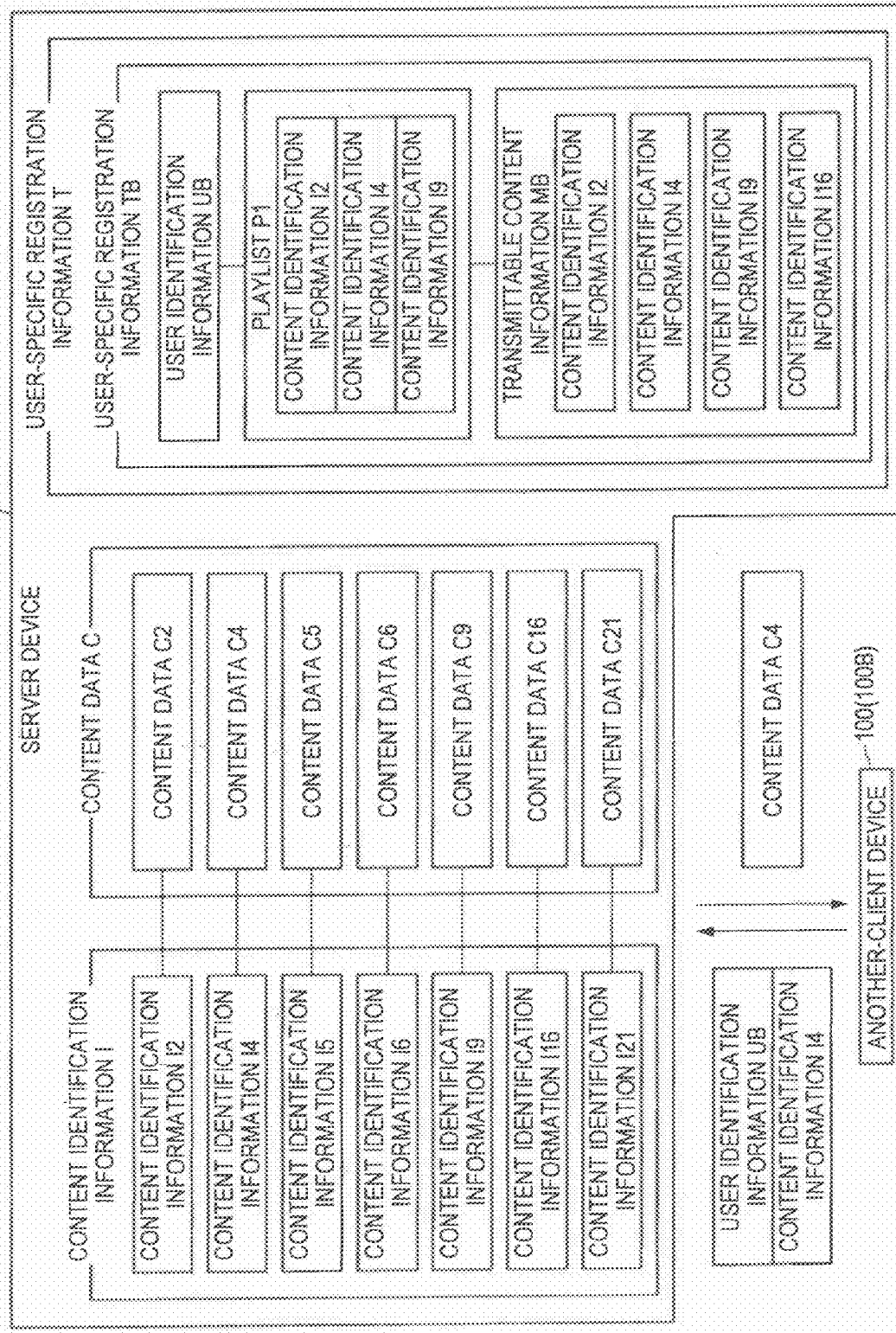
FIG. 2 is a diagram illustrating a flow of processing for using, by an another-client device, content data held by a server device according to the embodiment of the present invention.

FIG. 2 is a diagram illustrating a flow of processing for using, by the another-client device 100B, content data held by the server device 200 according to the embodiment of the present invention. With reference to FIG. 2, there will be described the processing for using, by the another-client device 100B, the content data held by the server device 200 according to the embodiment of the present invention.

As shown in FIG. 2, the server device 200 according to the embodiment of the present invention stores content data C and content identification information I for identifying the content data C. The content identification information I may be any information as long as it is used for identifying the content data C. For example, the content identification information I may be an ID uniquely allocated to the content data C, a title of the content data C, names of the casts of the content data C, a genre of the content data C, and the like.

Further, the server device 200 is capable of storing user-specific registration information T which is registration information specific to each user. In the example shown in FIG. 2, there is registered in advance user-specific registration information TB, which is registration information of the user B using the another-client device 100B, as the user-specific registration information T in the server device 200.

The user-specific registration information TB is information in which at least user identification information UB and transmittable content information MB are associated with each other. The user identification information UB may be any information as long as it is used for identifying the user B. For example, the user identification information UB may be an ID uniquely allocated to the user B, a name of the user B, and the like. The transmittable content information MB is information for identifying content data C that can be transmitted, by the server device 200, to the another-client device 100B. In addition thereto, the user-specific registration information TB may also include a playlist P1 associated with the user identification information UB. The playlist P1 is information obtained by arranging multiple pieces of content identification information I in reproduction order.

Here, for example, let us assume that the another-client device 100B transmits a content transmission request including the user identification information UB and content identification information I4 to the server device 200 by predetermined operation performed by the user B who uses the another-client device 100B. When receiving the content transmission request from the another-client device 100B, the server device 200 refers to the transmittable content information MB registered in association with the user identification information UB included in the content transmission request. Then, the server device 200 determines whether or not the content identification information I4 included in the content transmission request is registered in the transmittable content information MB.

As shown in FIG. 2, in the case where the content identification information I4 is registered in the transmittable content information MB of the user-specific registration information TB, the server device 200 transmits, as a response to the content transmission request, content data C4 identified by the content identification information I4 to the another-client device 100B. In the case where the content identification information I4 is not registered in the transmittable content information MB of the user-specific registration information TB, the server device 200 can be prohibited from transmitting, in principle, the content data C4 identified by the content identification information I4 as a response to the content transmission request to the another-client device 100B.

As described with reference to FIG. 2, let us assume that the user-specific registration information TB of the user B is registered in advance, and the content identification information I4 is registered as the transmittable content information MB of the user-specific registration information TB. In this case, when the another-client device 100B transmits the content transmission request including the user identification information UB and the content identification information I4 to the server device 200, the another-client device 100B can receive the content data C4 identified by the content identification information I4.

On the other hand, let us assume that the content identification information I4 is not registered as the transmittable content information MB of the user-specific registration information TB. In this case, when the another-client device 100B transmits the content transmission request including the user identification information UB and the content identification information I4 to the server device 200, the another-client device 100B cannot receive the content data C4 identified by the content identification information I4.

[1-3. Examples of Various Types of Information Held by First Client Device]

Figure 3:
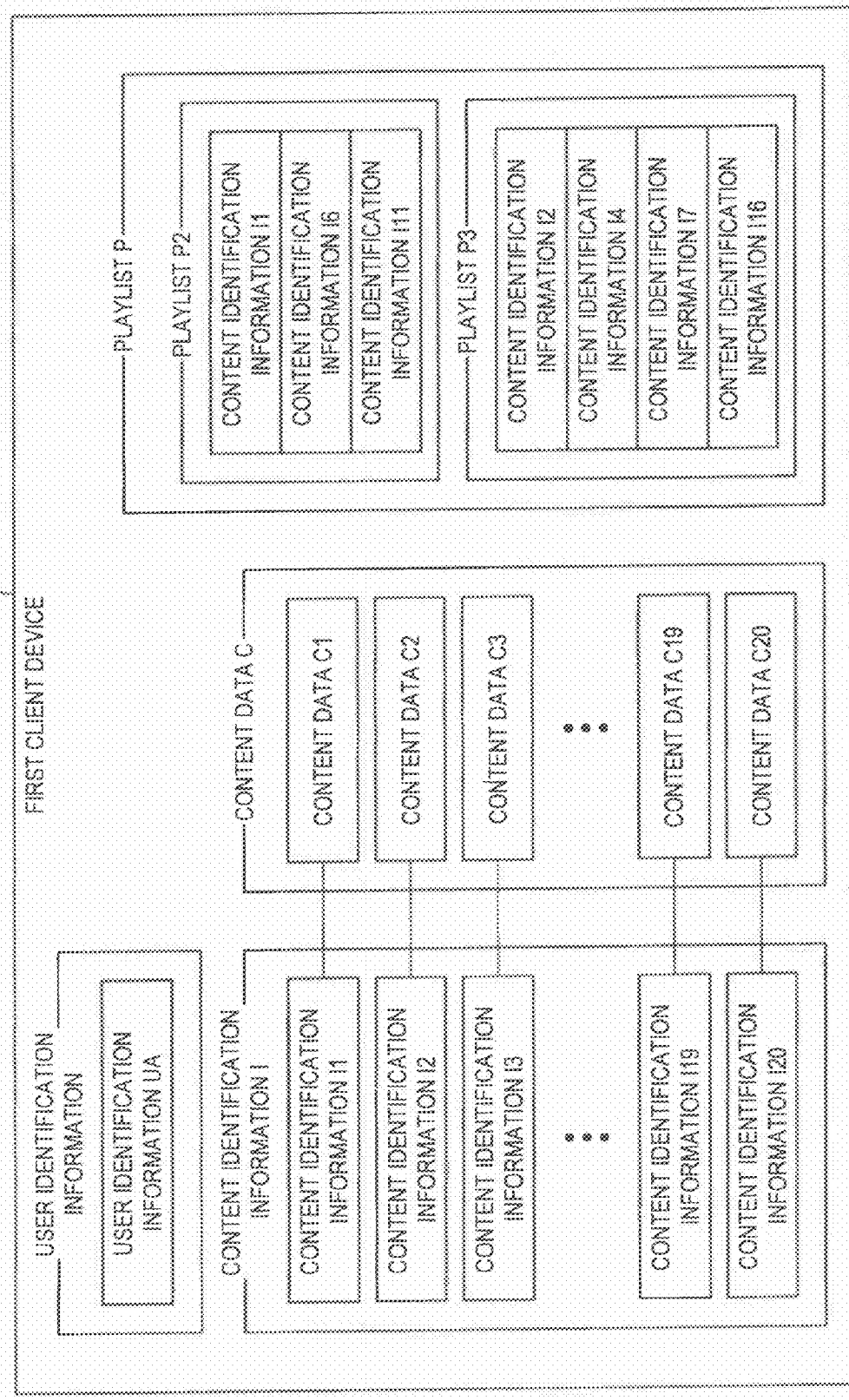
FIG. 3 is a diagram showing examples of various types of information held by a first client device according to the embodiment of the present invention.

FIG. 3 is a diagram showing examples of various types of information held by the first client device 100A1 according to the embodiment of the present invention. With reference to FIG. 3, examples of various types of information held by the first client device 100A1 according to the embodiment of the present invention will be described.

As shown in FIG. 3, the first client device 100A1 according to the embodiment of the present invention stores content data C and content identification information I for identifying the content data C. Further, the first client device 100A1 is capable of storing user identification information UA for identifying the user A who uses the first client device 100A1. The user identification information UA may be any information as long as it is used for identifying the user A. For example, the user identification information UA may be an ID uniquely allocated to the user A, a name of the user A, and the like. The user identification information UA may be registered in advance by the first client device 100A1, or may be input to the first client device 100A1 by the user A when the necessity arises.

Further, the first client device 100A1 is capable of storing a playlist P. In the example shown in FIG. 3, there are stored in advance a playlist P2 and a playlist P3 as the playlists P in the first client device 100A1. The playlist P is information obtained by arranging multiple pieces of content identification information I in reproduction order.

[1-4. Processing for Registering Content Identification Information by First Client Device]

Figure 4:
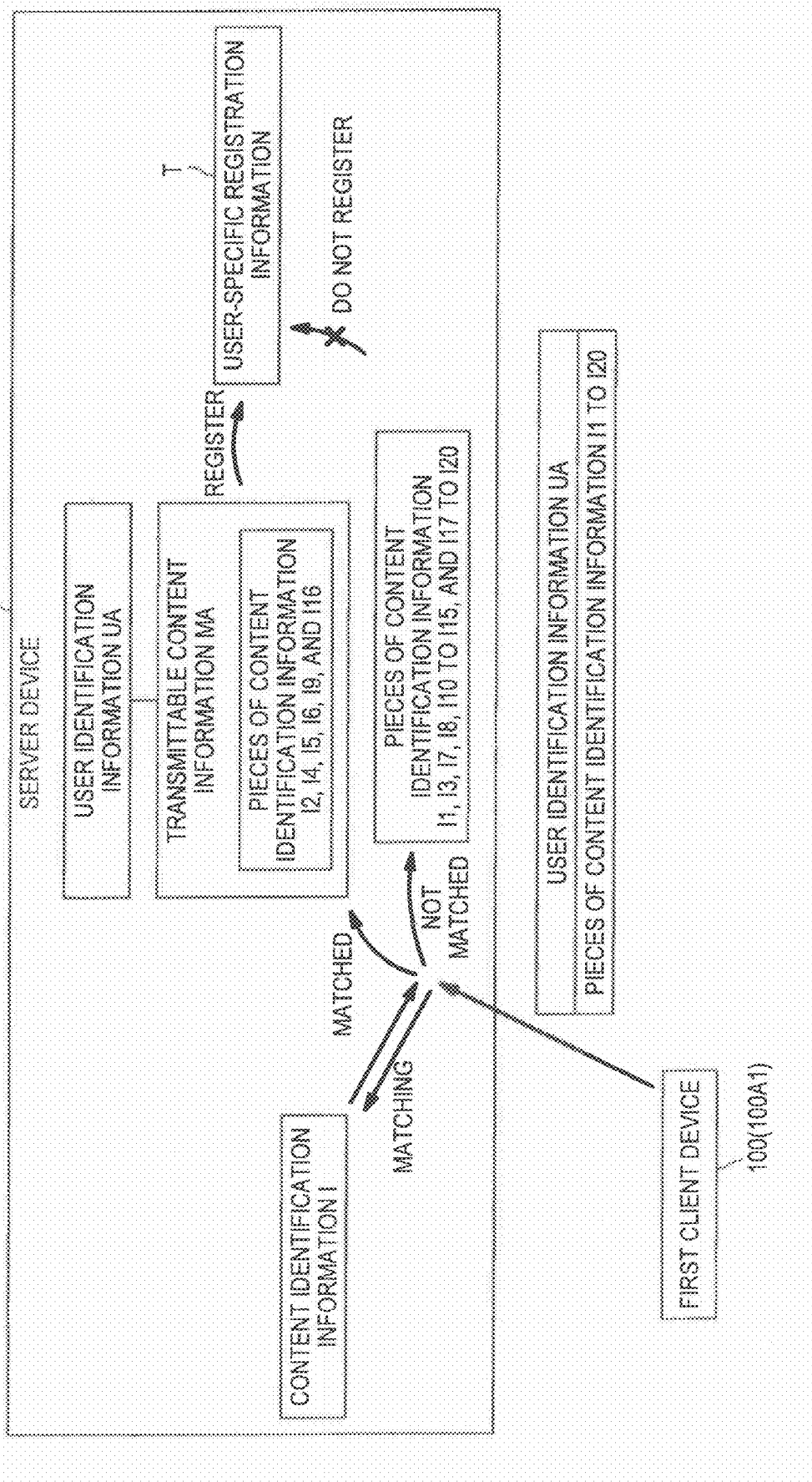
FIG. 4 is a diagram illustrating a flow of processing for registering, by the first client device according to the embodiment of the present invention, content identification information in the server device.

FIG. 4 is a diagram illustrating a flow of processing for registering, by the first client device 100A1 according to the embodiment of the present invention, content identification information I in the server device 200. With reference to FIG. 4, there will be described the flow of processing for registering, by the first client device 100A1 according to the embodiment of the present invention, content identification information I in the server device 200.

For example, let us assume that the first client device 100A1 transmits a registration request including the user identification information UA and pieces of content identification information I1 to I20 to the server device 200 by predetermined operation performed by the user A who uses the first client device 100A1. When receiving the registration request from the first client device 100A1, the server device 200 determines whether or not the pieces of content identification information I1 to I20 included in the registration request are registered in the server device 200. That is, the server device 200 performs matching between the pieces of content identification information I1 to I20 included in the registration request and the content identification information I registered in the server device 200.

When the content identification information I as shown in FIG. 2 is registered in the server device 200, the server device 200 determines that, among the pieces of content identification information I1 to I20 included in the registration request, pieces of content identification information I1, I3, I7, I8, I10 to I15, I17, and I20 are not registered in the server device 200. That is, the server device 200 determines that, among the pieces of content identification information I1 to I20 included in the registration request, the pieces of content identification information I1, I3, I7, I8, I10 to I15, I17, and I20 are not matched with the content identification information I registered in the server device 200. In this case, the server device 200 does not, in principle, register user-specific registration information TA in which the pieces of content identification information I1, I3, I7, I8, I10 to I15, I17, and I20 and the user identification information UA are associated with each other in the user-specific registration information T.

On the other hand, when the content identification information I as shown in FIG. 2 is registered in the server device 200, the server device 200 determines that, among the pieces of content identification information I1 to I20 included in the registration request, pieces of content identification information I2, I4, I5, I6, I9, and I16 are registered in the server device 200. That is, the server device 200 determines that, among the pieces of content identification information I1 to I20 included in the registration request, the pieces of content identification information I2, I4, I5, I6, I9, and I16 match with the content identification information I registered in the server device 200. In this case, the server device 200 registers the user-specific registration information TA in which the pieces of content identification information I2, I4, I5, I6, I9, and I16 and the user identification information UA are associated with each other in the user-specific registration information T.

[1-5. Processing for Registering Playlist by First Client Device]

Figure 5:
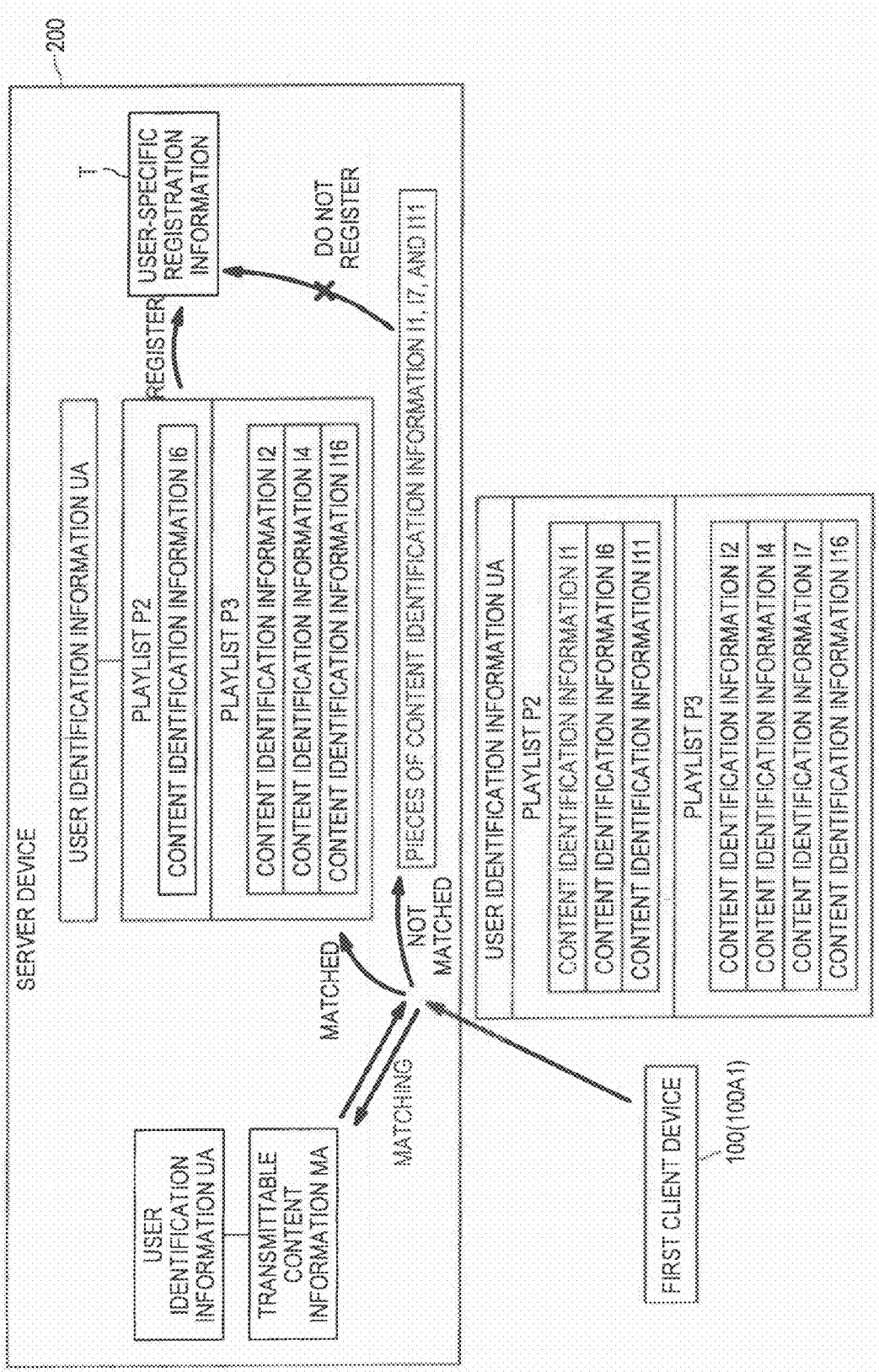
FIG. 5 is a diagram illustrating a flow of processing for registering, by the first client device according to the embodiment of the present invention, a playlist in the server device.

FIG. 5 is a diagram illustrating a flow of processing for registering, by the first client device 100A1 according to the embodiment of the present invention, a playlist in the server device 200. With reference to FIG. 5, there will be described the flow of processing for registering, by the first client device 100A1 according to the embodiment of the present invention, the playlist in the server device 200.

For example, let us assume that the first client device 100A1 transmits a registration request including the user identification information UA and the playlists P2 and P3 to the server device 200 by predetermined operation performed by the user A who uses the first client device 100A1. When receiving the registration request from the first client device 100A1, the server device 200 determines whether or not the pieces of content identification information I1, I6, and I11 included in the playlist P2 that is included in the registration request are registered in transmittable content information MA corresponding to the user identification information UA included in the registration request. That is, the server device 200 performs matching between: the pieces of content identification information I1, I6, and I11 included in the playlist P2 that is included in the registration request; and the transmittable content information MA corresponding to the user identification information UA included in the registration request.

When the transmittable content information MA as shown in FIG. 4 is registered in the server device 200, the server device 200 determines that, among the pieces of content identification information I1, I6, and I11 included in the playlist P2 that is included in the registration request, pieces of content identification information I1 and I11 are not registered in the transmittable content information MA. That is, the server device 200 determines that, among the pieces of content identification information I1, I6, and I11 included in the playlist P2 that is included in the registration request, the pieces of content identification information I1 and I11 are not matched with the transmittable content information MA registered in the server device 200. In this case, the server device 200 does not, in principle, register the pieces of content identification information I1 and I11 in the user-specific registration information T.

On the other hand, when the transmittable content information MA as shown in FIG. 4 is registered in the server device 200, the server device 200 determines that, among the pieces of content identification information I1, I6, and I11 included in the playlist P2 that is included in the registration request, the content identification information I6 is registered in the server device 200. That is, the server device 200 determines that, among the pieces of content identification information I1, I6, and I11 included in the playlist P2 that is included in the registration request, the content identification information I6 matches with the transmittable content information MA registered in the server device 200. In this case, the server device 200 registers, in the user-specific registration information T, user-specific registration information obtained by associating the playlist P2 in which the content identification information I6 is left (pieces of content identification information I1 and I11 are eliminated) with the user identification information UA.

In the same manner, when receiving the registration request from the first client device 100A1, the server device 200 determines whether or not the pieces of content identification information I2, I4, I7, and I16 included in the playlist P3 that is included in the registration request are registered in the transmittable content information MA corresponding to the user identification information UA included in the registration request. That is, the server device 200 performs matching between: the pieces of content identification information I2, I4, I7, and I16 included in the playlist P3 that is included in the registration request; and the transmittable content information MA corresponding to the user identification information UA included in the registration request.

When the transmittable content information MA as shown in FIG. 4 is registered in the server device 200, the server device 200 determines that, among the pieces of content identification information I2, I4, I7, and I16 included in the playlist P3 that is included in the registration request, the content identification information I7 is not registered in the transmittable content information MA. That is, the server device 200 determines that, among the pieces of content identification information I2, I4, I7, and I16 included in the playlist P3 that is included in the registration request, the content identification information I7 is not matched with the transmittable content information MA registered in the server device 200. In this case, the server device 200 does not, in principle, register the content identification information I7 in the user-specific registration information T.

On the other hand, when the transmittable content information MA as shown in FIG. 4 is registered in the server device 200, the server device 200 determines that, among the pieces of content identification information I2, I4, I7, and I16 included in the playlist P3 that is included in the registration request, the pieces of content identification information I2, I4, and I16 are registered in the server device 200. That is, the server device 200 determines that, among the pieces of content identification information I2, I4, I7, and I16 included in the playlist P3 that is included in the registration request, the pieces of content identification information I2, I4, and I16 match with the transmittable content information MA registered in the server device 200. In this case, the server device 200 registers, in the user-specific registration information T, user-specific registration information obtained by associating the playlist P3 in which the pieces of content identification information I2, I4, and I16 are left (content identification information I7 is eliminated) with the user identification information UA.

Note that, in the example shown in FIG. 5, the server device 200 performs matching between each of the playlists P2 and P3 included in the registration request and the transmittable content information MA, but the technique of matching is not limited thereto. For example, the server device 200 may perform matching between each of the playlists P2 and P3 included in the registration request and the content identification information I registered in the server device 200. Further, the server device 200 may not perform matching, and may register information as it is, in which the user identification information UA included in the registration request and the playlists P2 and P3 are associated with each other, in the user-specific registration information T.

[1-6. Processing for Using Content Data by Second Client Device]

Figure 6:
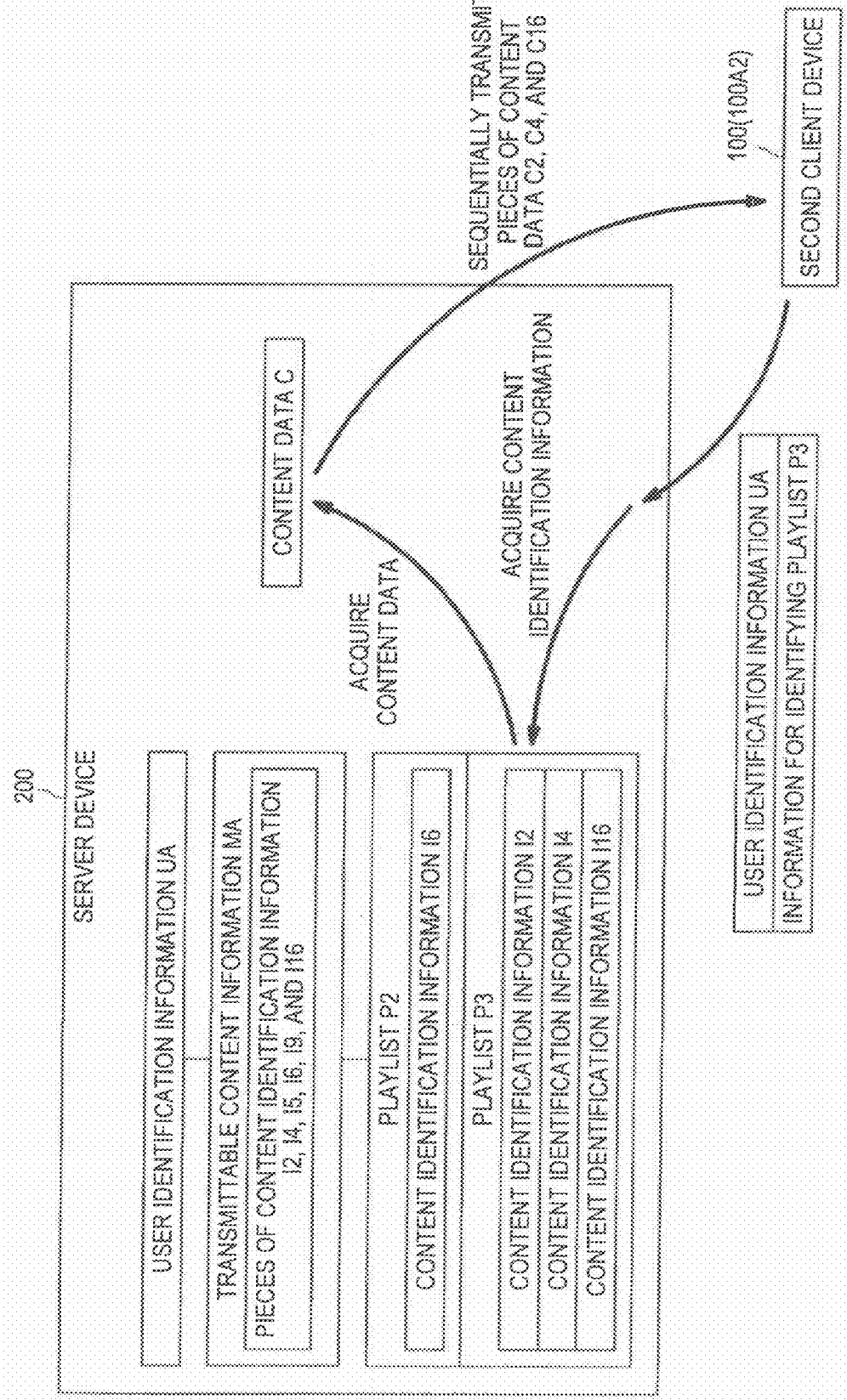
FIG. 6 is a diagram illustrating a flow of processing for using, by a second client device, content data in accordance with the playlist registered in the server device according to the embodiment of the present invention.

FIG. 6 is a diagram illustrating a flow of processing for using, by the second client device 100A2, content data in accordance with the playlist registered in the server device 200 according to the embodiment of the present invention. With reference to FIG. 6, there will be described the flow of processing for using, by the second client device 100A2, the content data in accordance with the playlist registered in the server device 200 according to the embodiment of the present invention.

As a result of performing the registration processing shown in FIGS. 4 and 5, the server device 200 according to the embodiment of the present invention stores information obtained by associating the user identification information UA, the transmittable content information MA, and the playlists P2 and P3 with each other, as shown in FIG. 6.

Here, for example, let us assume that the second client device 100A2 transmits a content transmission request including the user identification information UA and information for identifying the playlist P3 to the server device 200 by predetermined operation performed by the user A who uses the second client device 100A2. When receiving the content transmission request from the second client device 100A2, the server device 200 refers to the playlist P registered in association with the user identification information UA included in the content transmission request. Then, the server device 200 acquires the pieces of content identification information I2, I4, and I16 from the playlist P3 which is identified by the information for identifying the playlist P3 included in the content transmission request.

Subsequently, the server device 200 acquires pieces of content data C2, C4, and C16 identified by the acquired pieces of content identification information I2, I4, and I16 from the content data C, and sequentially transmits the acquired pieces of content data C2, C4, and C16 to the second client device 100A2. When sequentially receiving the pieces of content data C2, C4, and C16, the second client device 100A2 can stream-reproduce the pieces of content data C2, C4, and C16 in the order of receiving them, for example.

With reference to FIG. 6, there has been described the example in which the second client device 100A2 sequentially receives and stream-reproduces the pieces of content identification information I2, I4, and I16 included in the playlist P3, the second client device 100A2 may also transmit content identification information I directly to the server device 200. In this case, for example, the second client device 100A2 transmits a content transmission request including the user identification information UA and the content identification information I to the server device 200.

When receiving the content transmission request from the second client device 100A2, the server device 200 refers to the transmittable content information MA registered in association with the user identification information UA included in the content transmission request. Then, the server device 200 acquires content data C identified by the content identification information I included in the content transmission request. Subsequently, the server device 200 acquires content data C identified by the acquired content identification information I, and transmits the acquired content data C to the second client device 100A2. When receiving the content data C, the second client device 100A2 can stream-reproduce the content data C, for example.

Note that, here, although there has been described the example in which the second client device 100A2 stream-reproduces the content data C received from the server device 200, the second client device 100A2 may not necessarily stream-reproduce the content data C received from the server device 200. The second client device 100A2 can hold the content data C received from the server device 200 and can also reproduce the content data C off-line.

As described with reference to FIGS. 3 to 6, the user-specific registration information TA about the user A can be registered in the server device 200 by the first client device 100A1. Let us assume that the content identification information I2 is registered as the transmittable content information MA of the user-specific registration information TA. In this case, when the second client device 100A2 transmits a content transmission request including the user identification information UA and the content identification information I2 to the server device 200, the second client device 100A2 can receive the content data C2 identified by the content identification information I2.

On the other hand, the first client device 100A1 may not register the content identification information I3 as the transmittable content information MA of the user-specific registration information TA. In this case, when the second client device 100A2 transmits a content transmission request including the user identification information UA and the content identification information I3 to the server device 200, the second client device 100A2 cannot receive the content data C3 identified by the content identification information I3.

According to the embodiment of the present invention, content identification information I for identifying the content data C, which can be used by the first client device 100A1, can be registered in the server device 200. In the case where the user A who uses the first client device 100A1 can also use the second client device 100A2, the second client device 100A2 can download, from the server device 200, the content data C identified by the content identification information I registered by the first client device 100A1. Accordingly, it becomes possible, in order to use the content data C by the second client device 100A2, to reduce the time and effort to upload the content data C from the first client device 100A1 to the server device 200.

Further, there is assumed a case where a protocol used when the first client device 100A1 uses content data is different from a protocol used when the second client device 100A2 uses the content data. In this case, when the content data is directly transmitted from the first client device 100A1 to the second client device 100A2, there arises a necessity for the second client device 100A2 to convert the content data transmitted from the first client device 100A1 into content data suitable for the protocol which the second client device 100A2 uses. According to the embodiment of the present invention, since content data C according to a protocol which a client device 100 uses can be registered in the server device 200 in advance, there is also an advantage in that the second client device 100A2 may not convert the content data C into a form suitable for the second client device 100A2.

[1-7. Functional Configuration of First Client Device]

Figure 7:
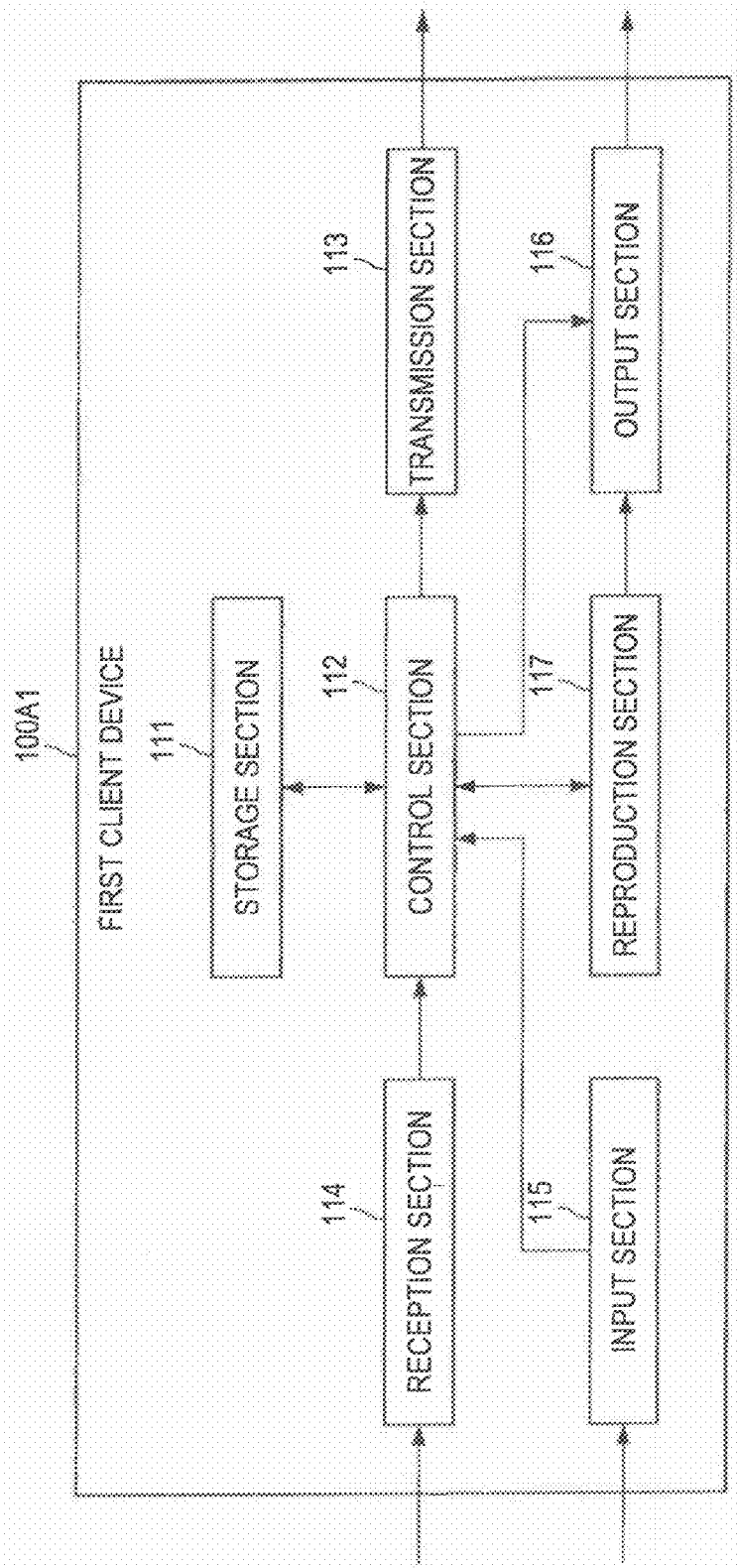
FIG. 7 is a diagram showing a functional configuration of the first client device according to the embodiment of the present invention.

FIG. 7 is a diagram showing a functional configuration of the first client device 100A1 according to the embodiment of the present invention. With reference to FIG. 7, the first client device 100A1 according to the embodiment of the present invention will be described.

As shown in FIG. 7, the first client device 100A1 includes at least a storage section 111, a control section 112, and a transmission section 113. Further, the first client device 100A1 includes as necessary a reception section 114, an input section 115, an output section 116, a reproduction section 117, and the like.

The storage section 111 is capable of storing content data, a playlist, and the like, and the content data stored in the storage section 111 may be acquired by the control section 112. Further, in the storage section 111, the content data may be registered by the control section 112. The registration of the content data into the storage section 111 is controlled by the control section 112 based on operation input from the user A via the input section 115, for example. The content data registered in the storage section 111 may be received by the reception section 114 or may be input via the input section 115. The storage section 111 is configured from, for example, a storage unit such as an HDD (Hard Disk Drive).

The control section 112 has a function of acquiring content identification information for identifying the content data stored in the storage section 111. There are assumed various techniques for acquiring the content identification information for identifying the content data stored in the storage section 111, and they are not particularly limited. For example, in the case where content identification information is added to the content data stored in the storage section 111, the content identification information added to the content data can be acquired. Further, for example, when an analysis result obtained by analyzing a part of or entire content data is input, a predetermined server which outputs content identification information for identifying the content data based on the analysis result is used, and the content identification information can also be acquired.

In addition thereto, the control section 112 has a function of controlling operation of respective functional blocks in the first client device 100A1. The control section 112 is configured from, for example, a CPU (Central Processing Unit) and a RAM (Random Access Memory), and the function thereof is realized by developing in the RAM a program stored in the storage section 111 and executing the developed program by the CPU. However, the control section 112 is not limited to such a configuration, and may be configured from a dedicated hardware.

The transmission section 113 has a function of transmitting, to the server device 200, a registration request including user identification information for identifying a user who uses the first client device 100A1 and the content identification information acquired by the control section 112. Then, the transmission section 113 has a function of, in the case where the server device 200 holds the content data identified by the content identification information included in the registration request, causing the server device 200 to hold information in which the user identification information and the content identification information, which are included in the registration request, are associated with each other as user-specific registration information. Accordingly, the content data which is held by the first client device 100A1 and which is held by the server device 200 can be downloaded from the server device 200 to the second client device 100A2. The transmission section 113 is configured from, for example, a communication unit.

There is also assumed a case where the server device 200 does not hold the content data identified by the content identification information included in the registration request. In this case, there are assumed various types of processing that are performed by the transmission section 113. For example, in the case where the server device 200 does not hold the content data identified by the content identification information included in the registration request, the transmission section 113 can cause the server device 200 to be prohibited from holding the user-specific registration information. Accordingly, the content data which is held by the first client device 100A1 and which is not held by the server device 200 cannot be downloaded from the server device 200 to the second client device 100A2.

Further, for example, in the case where the server device 200 does not hold the content data identified by the content identification information included in the registration request, the transmission section 113 can also cause the server device 200 to hold the user-specific registration information. Also at the same time, the transmission section 113 can transmit the content data stored in the storage section 111 to the server device 200, and can cause the server device 200 to hold the content data. Accordingly, it becomes possible that the content data which is held by the first client device 100A1 and which is not held by the server device 200 is uploaded from the first client device 100A1 to the server device 200, and is downloaded to the second client device 100A2.

The storage section 111 is also capable of further storing a playlist. In this case, the control section 112 acquires a playlist stored in the storage section 111, and the transmission section 113 can further transmit the playlist to the server device 200. Subsequently, the transmission section 113 can also cause the server device 200 to hold a list, which is obtained by eliminating the content identification information that is not included in the user-specific registration information from the playlist, in association with the user identification information included in the registration request. By registering the list obtained by eliminating the content identification information that is not included in the user-specific registration information from the playlist, only the content identification information for identifying the content data that can be downloaded from the server device 200 can be registered in the server device 200 as the playlist.

However, it is not necessarily the case that only the content identification information for identifying the content data that can be downloaded from the server device 200 is registered in the server device 200 as the playlist. For example, the transmission section 113 can unconditionally cause the server device 200 to hold a playlist stored in the storage section 111. That is, the control section 112 can acquire the playlist stored in the storage section 111, and the transmission section 113 can further transmit the playlist to the server device 200 and can also cause the server device 200 to hold the playlist in association with the user identification information. Alternatively, the transmission section 113 can also cause the server device 200 to hold a list, which is obtained by eliminating content identification information that is not included in the content identification information held by the server device 200 from the playlist, in association with the user identification information included in the registration request.

The reception section 114 has a function of receiving various types of information from the server device 200 via the network 300. For example, the reception section 114 has a function of, in the case where various requests generated by the control section 112 based on operation input via the input section 115 are transmitted by the transmission section 113, receiving responses with respect to the various requests from the server device 200. Further, as described above, the reception section 114 can also receive the content data to be stored in the storage section 111. Further, the content data received from the server device 200 can be reproduced by the reproduction section 117 based on control performed by the control section 112. The reception section 114 is configured from, for example, a communication unit.

The input section 115 has functions of accepting operation from a user and outputting the operation as an operation signal to the control section 112. The input section 115 is configured from, for example, an input unit. For example, various requests are generated by the control section 112 based on the operation input via the input section 115, and the various requests generated by the control section 112 are transmitted to the server device 200 by the transmission section 113.

The output section 116 has a function of outputting various types of information and various requests based on control performed by the control section 112. Further, the output section 116 has a function of outputting content data reproduced by the reproduction section 117. For example, in the case where the content data is audio data, the output section 116 may be configured from an audio output unit, and the audio output unit may output audio based on the audio data. For example, in the case where the content data is image data, the output section 116 may be configured from a display unit, and the display unit may output an image based on the image data.

As described above, the reproduction section 117 can reproduce the content data received from the server device 200 based on the control performed by the control section 112. For example, although the reproduction section 117 can stream-reproduce the content data received from the server device 200, the reproduction section 117 may not necessarily stream-reproduce the content data received from the server device 200. The reproduction section 117 is also capable of reproducing the content data off-line, which is received by the reception section 114 from the server device 200.

[1-8. Functional Configuration of Server Device]

Figure 8:
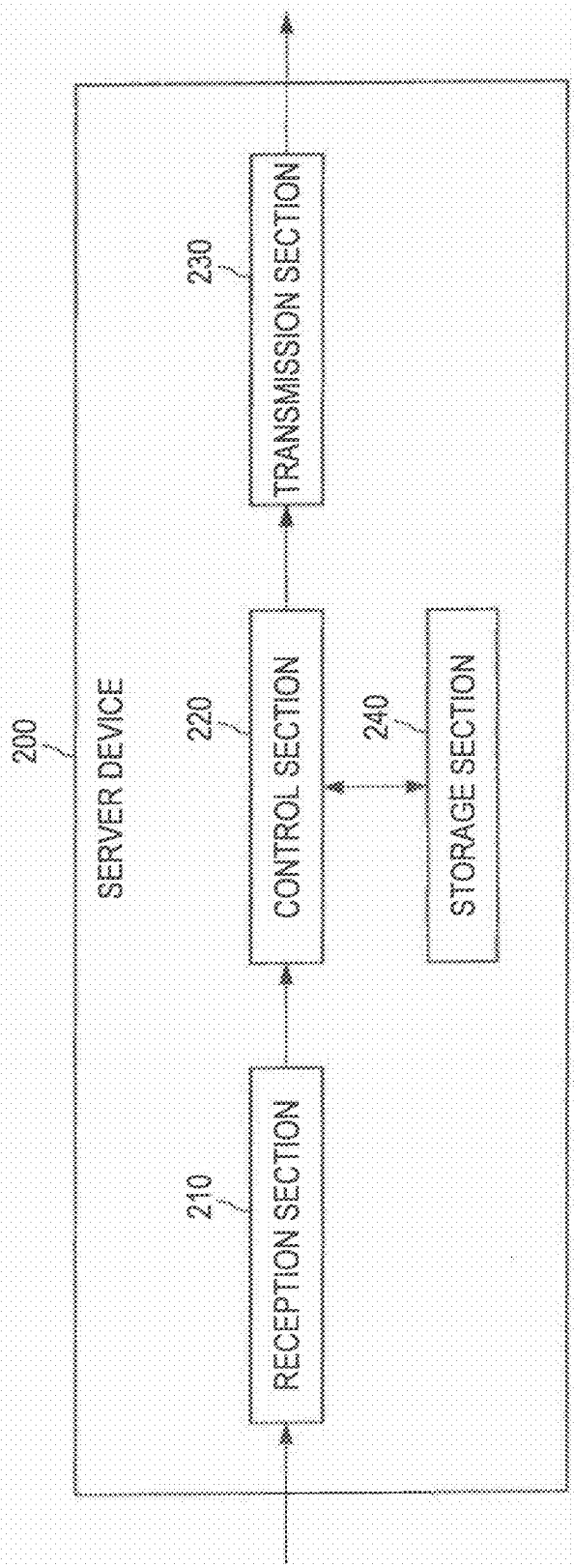
FIG. 8 is a diagram showing a functional configuration of the server device according to the embodiment of the present invention.

FIG. 8 is a diagram showing a functional configuration of the server device 200 according to the embodiment of the present invention. With reference to FIG. 8, the functional configuration of the server device 200 according to the embodiment of the present invention will be described.

As shown in FIG. 8, the server device 200 includes at least a storage section 240, a reception section 210, and a control section 220. Further, the server device 200 includes as necessary a transmission section 230 and the like.

The storage section 240 is capable of storing content data, user-specific registration information, and the like, and the content data stored in the storage section 240 may be acquired by the control section 220. Further, in the storage section 240, the content data may be registered by the control section 220. The registration of the content data into the storage section 240 is controlled by the control section 220, for example. The server device 200 can hold various types of information by mainly storing the various types of information in the storage section 240. The content data registered in the storage section 240 may be received by the reception section 210. The storage section 240 is configured from, for example, a storage unit such as an HDD.

The reception section 210 has a function of receiving various types of information and various requests from the first client device 100A1 and the second client device 100A2 via the network 300. For example, when receiving various requests from the first client device 100A1 and the second client device 100A2 via the network 300, the reception section 210 outputs the various requests to the control section 220, and then responses with respect to the various requests are generated by the control section 220. Further, the reception section 210 has a function of receiving a registration request from the first client device 100A1. The reception section 210 is configured from, for example, a communication unit.

The control section 220 has a function of, in the case where content data identified by content identification information included in the registration request received by the reception section 210 is stored in the storage section 240, causing the storage section 240 to store information in which user identification information and content identification information, which are included in the registration request, are associated with each other as user-specific registration information. The control section 220 is configured from, for example, a CPU and a RAM, and the function thereof is realized by developing in the RAM a program stored in the storage section 240 and executing the developed program by the CPU. However, the control section 220 is not limited to such a configuration, and may be configured from a dedicated hardware.

The transmission section 230 has a function of transmitting various types of information and various responses to the first client device 100A1 or the second client device 100A2 via the network 300 based on control performed by the control section 220. The transmission section 230 is configured from, for example, a communication unit.

[1-9. Functional Configuration of Second Client Device]

Figure 9:
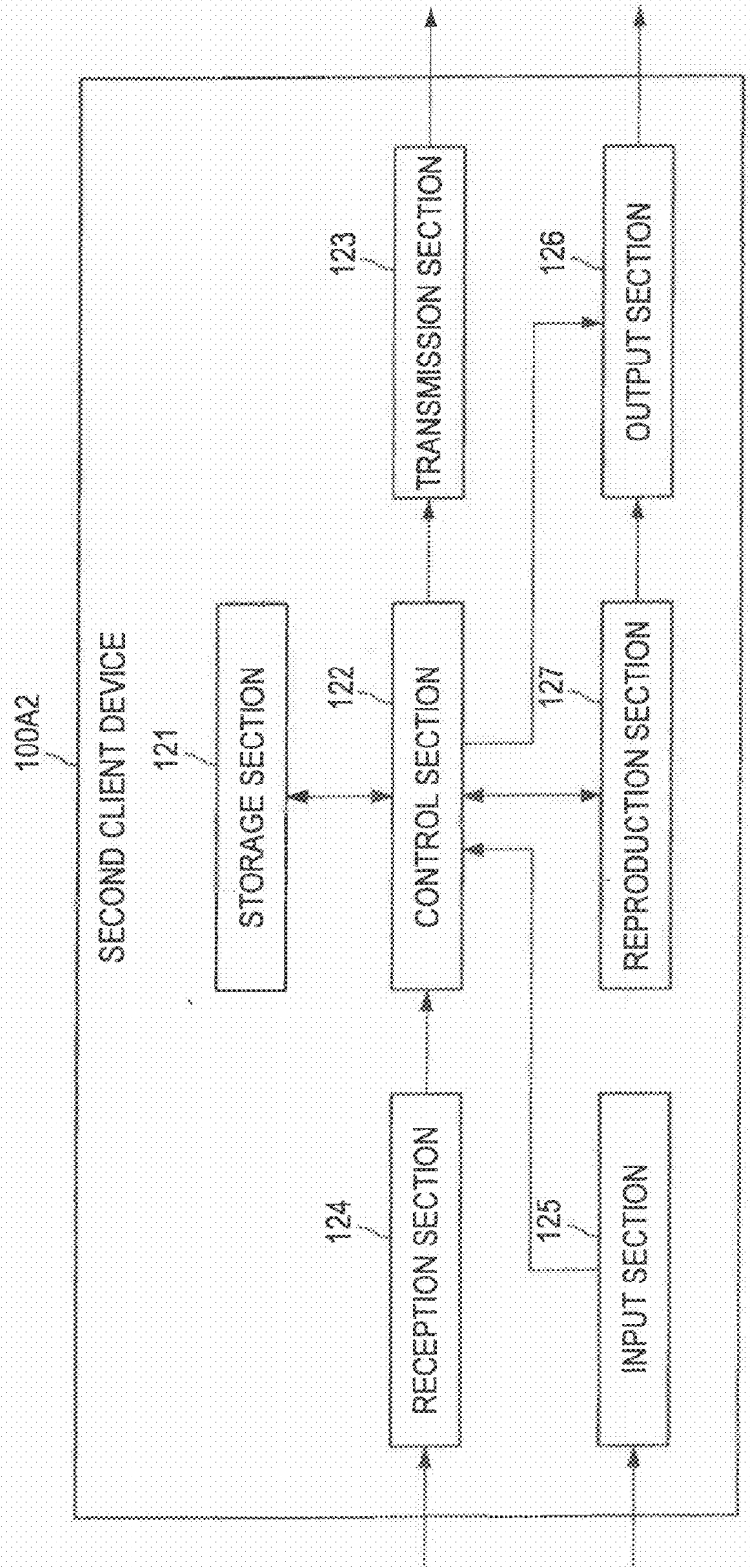
FIG. 9 is a diagram showing a functional configuration of the second client device according to the embodiment of the present invention.

FIG. 9 is a diagram showing a functional configuration of the second client device 100A2 according to the embodiment of the present invention. With reference to FIG. 9, the functional configuration of the second client device 100A2 according to the embodiment of the present invention will be described.

As shown in FIG. 9, the second client device 100A2 includes at least a control section 122, a transmission section 123, and a reception section 124. Further, the second client device 100A2 includes as necessary a storage section 121, an input section 125, an output section 126, a reproduction section 127, and the like.

The control section 122 has a function of acquiring content identification information designated by the user who uses the second client device 100A2 as selection information. For example, the control section 122 can acquire the content identification information designated by operation input by the user via the input section 125 as the selection information. In addition thereto, the control section 122 has a function of controlling operation of respective functional blocks in the second client device 100A2.

The control section 122 is configured from, for example, a CPU and a RAM, and the function thereof is realized by developing in the RAM a program stored in the storage section 121 and executing the developed program by the CPU. However, the control section 122 is not limited to such a configuration, and may be configured from a dedicated hardware.

The transmission section 123 has a function of transmitting, to the server device 200, a content transmission request including user identification information for identifying the user and the selection information acquired by the control section 122. Further, the transmission section 123 has a function of, in the case where the server device 200 holds information in which the user identification information and the selection information, which are included in the transmitted content transmission request, are associated with each other as user-specific registration information, causing the server device 200 to execute the transmission of content data identified by the selection information as a response to the content transmission request.

Accordingly, the content data which is held by the first client device 100A1 and which is held by the server device 200 can be downloaded from the server device 200 to the second client device 100A2. The content data transmitted from the server device 200 is received by the reception section 124 of the second client device 100A2 which has transmitted the content transmission request. The transmission section 123 is configured from, for example, a communication unit.

The reception section 124 has a function of receiving various types of information from the server device 200 via the network 300. For example, the reception section 124 has a function of, in the case where various requests generated by the control section 122 based on operation input via the input section 125 are transmitted by the transmission section 123, receiving responses with respect to the various requests from the server device 200. Further, as described above, the reception section 124 can also receive the content data to be stored in the storage section 121. Further, the content data received from the server device 200 can be reproduced by the reproduction section 127 based on control performed by the control section 122. The reception section 124 is configured from, for example, a communication unit.

There is also assumed a case where the content data identified by the content identification information included in the content transmission request is not held by the server device 200. In this case, there are assumed various types of processing that are performed by the transmission section 113. For example, in the case where the server device 200 does not hold, as the content identification information, the selection information included in the content transmission request in association with the user identification information, the transmission section 123 can cause the server device 200 to be prohibited from transmitting the content data identified by the selection information. Accordingly, the content data which is held by the first client device 100A1 and which is not held by the server device 200 cannot be downloaded from the server device 200 to the second client device 100A2.

The second client device 100A2 may have a function of registering the user-specific registration information in the server device 200 by transmitting a registration request to the server device 200. In this case, the second client device 100A2 may further include the storage section 121 which stores content data. Then, the control section 122 acquires content identification information for identifying the content data stored in the storage section 121, and the transmission section 123 transmits, to the server device 200, a registration request including user identification information for identifying a user A who uses the second client device 100A2 and the content identification information acquired by the control section 122. In addition, in the case where the server device 200 holds the content data identified by the content identification information included in the registration request, the transmission section 123 may cause the server device 200 to hold information in which the user identification information and the content identification information, which are included in the registration request, are associated with each other as the user-specific registration information.

There are assumed various techniques for acquiring the content identification information for identifying the content data stored in the storage section 121, and they are not particularly limited. For example, in the case where content identification information is added to the content data stored in the storage section 121, the content identification information added to the content data can be acquired. Further, for example, when an analysis result obtained by analyzing a part of or entire content data is input, a predetermined server which outputs content identification information for identifying the content data based on the analysis result is used, and the content identification information can also be acquired.

The storage section 121 is capable of storing content data, a playlist, and the like, and the content data stored in the storage section 121 may be acquired by the control section 122. Further, in the storage section 121, the content data may be registered by the control section 122. The registration of the content data into the storage section 121 is controlled by the control section 122 based on operation input from the user A via the input section 125, for example. The content data registered in the storage section 121 may be received by the reception section 124 or may be input via the input section 125. The storage section 121 is configured from, for example, a storage unit such as an HDD.

The second client device 100A2 may register the user-specific registration information in the server device 200 in the same manner as the first client device 100A1. However, the second client device 100A2 may also register the user-specific registration information in the server device 200 by a different technique from the technique used by the first client device 100A1.

For example, the transmission section 123 transmits, to the server device 200, the registration request including the user identification information for identifying the user A who uses the second client device 100A2 and the content identification information acquired by the control section 122. Then, in the case where the server device 200 holds the content data identified by the content identification information included in the registration request, the transmission section 123 may cause the server device 200 to continuously hold the user-specific registration information, which has already been held by the server device 200, and may also cause the server device 200 to add information in which the user identification information and the content identification information, which are included in the registration request, are associated with each other to the user-specific registration information.

In this way, by registering the user-specific registration information, the transmission section 123 can leave the user-specific registration information which has already been registered in the server device 200, and at the same time, can also add difference information between the already registered content identification information and the content identification information included in the registration request to the user-specific registration information which has already been registered in the server device 200. For example, such a registration technique may be adopted in the case where the user A uses the first client device 100A1 as a main device for registering the user-specific registration information in the server device 200 and uses the second client device 100A2 as a subordinate device for registering the user-specific registration information in the server device 200.

The control section 122 acquires a playlist stored in the storage section 121, and the transmission section 123 can further transmit the playlist to the server device 200. Subsequently, the transmission section 123 can also cause the server device 200 to hold a list, which is obtained by eliminating content identification information that is not included in the user-specific registration information from the playlist, in association with the user identification information included in the registration request. By registering the list obtained by eliminating the content identification information that is not included in the user-specific registration information from the playlist, only the content identification information for identifying the content data that can be downloaded from the server device 200 can be registered in the server device 200 as the playlist.

However, it is not necessarily that only the content identification information for identifying the content data that can be downloaded from the server device 200 is registered in the server device 200 as the playlist. For example, the transmission section 123 can unconditionally cause the server device 200 to hold a playlist stored in the storage section 121. That is, the control section 122 can acquire the playlist stored in the storage section 121, and the transmission section 123 can further transmit the playlist to the server device 200 and can also cause the server device 200 to hold the playlist in association with the user identification information. Alternatively, the transmission section 123 can also cause the server device 200 to hold a list, which is obtained by eliminating content identification information that is not included in the content identification information held by the server device 200 from the playlist, in association with the user identification information included in the registration request.

The input section 125 has functions of accepting operation from a user and outputting the operation as an operation signal to the control section 122. The input section 125 is configured from, for example, an input unit. For example, various requests are generated by the control section 122 based on the operation input via the input section 125, and the various requests generated by the control section 122 are transmitted to the server device 200 by the transmission section 123.

The output section 126 has a function of outputting various types of information and various requests based on control performed by the control section 122. Further, the output section 126 has a function of outputting content data reproduced by the reproduction section 127. For example, in the case where the content data is audio data, the output section 126 may be configured from an audio output unit, and the audio output unit may output audio based on the audio data. For example, in the case where the content data is image data, the output section 126 may be configured from a display unit, and the display unit may output an image based on the image data.

As described above, the reproduction section 127 can reproduce the content data received from the server device 200 based on the control performed by the control section 122. For example, although the reproduction section 127 can stream-reproduce the content data received from the server device 200, the reproduction section 127 may not necessarily stream-reproduce the content data received from the server device 200. The reproduction section 127 is also capable of reproducing the content data off-line, which is received by the reception section 124 from the server device 200.

[1-10. Display Example of Information Related to Content Data]

Figure 10:
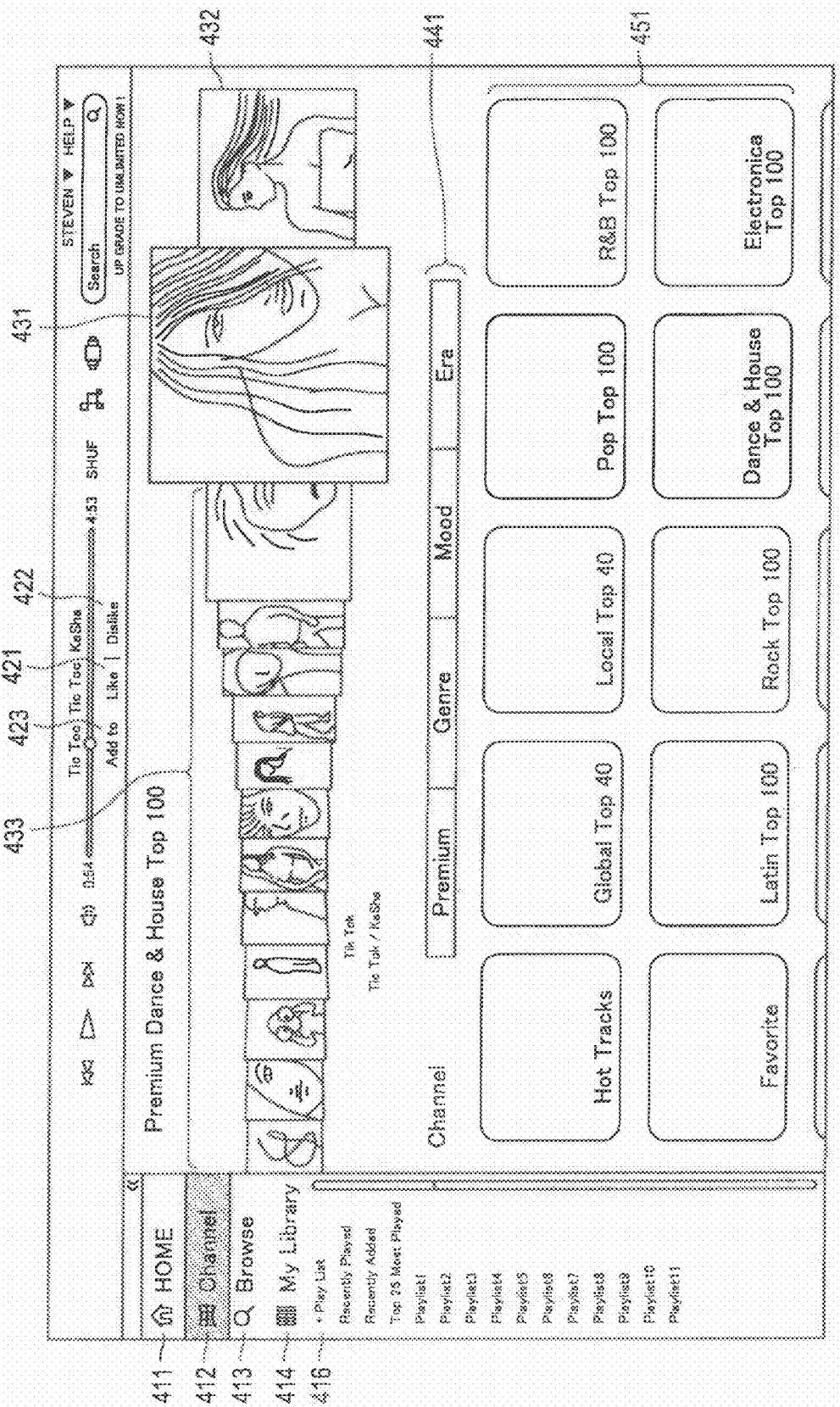
FIG. 10 is a diagram showing a display example in the case where information related to content data held by the server device according to the embodiment of the present invention is displayed by a client device.

FIG. 10 is a diagram showing a display example in the case where information related to content data held by the server device 200 according to the embodiment of the present invention is displayed by a client device 100. With reference to FIG. 10, there will be described the display example in the case where information related to the content data held by the server device 200 according to the embodiment of the present invention is displayed by the client device 100. Note that the client device 100 according to the embodiment of the present invention is a collective term used for the first client device 100A1, the second client device 100A2, the another-client device 100B, and the like. Hereinafter, a flow of processing will be described based mainly on the respective functional blocks included in the first client device 100A1. However, it goes without saying that it is also possible to perform the processing based mainly on the respective functional blocks included in the second client device 100A2, the another-client device 100B, or the like.

The transmission section 113 transmits, to the server device 200, an information transmission request which is a request for acquiring content-related information, which is information related to content data held by the server device 200. In this case, the client device 100 further includes the reception section 114 which receives, from the server device 200, the content-related information as a response to the information transmission request, and the control section 112 can cause a predetermined display section to display the content-related information received by the reception section 114 from the server device 200. The control section 112 controls the transmission section 113 in a manner that the information transmission request is transmitted to the server device 200 based on predetermined operation input by a user via the input section 115, for example. The predetermined operation corresponds to, for example, operation that a "Channel" button 412 being selected. The display section is an example of the output section 116.

As shown in FIG. 10, the control section 112 can cause the display section to display the content-related information received by the reception section 114 from the server device 200 as, for example, images 431, 432, and 433. The image 431 is an image as an example of information related to the content data currently being selected, the image 432 is an image as an example of information related to the content data that has been selected the last time, and one or multiple images 433 are arranged in a manner that, among the pieces of information related to the pieces of content data that can be selected hereafter, information related to content data which is more fitted to a preference of the user is placed nearer to the image 431.

When any one of the images 431, 432, and 433 is selected by the user, the control section 112 recognizes that content data corresponding to the selected image is currently selected, for example, and it becomes possible to download the content data currently being selected from the server device 200 and to reproduce the content data by predetermined operation such as pressing a reproduction button.

In the example shown in FIG. 10, among a "HOME" button 411, a "Channel" button 412, a "Browse" button 413, and a "My Library" button 414, the "Channel" button 412 is selected. Accordingly, one or multiple images 433 shown in FIG. 10 are arranged in a manner that, within a channel selected by the user, information related to content data which is more fitted to the preference of the user is placed nearer to the image 431. The channel may be selected by the user with reference to channel-related information 451 acquired from the server device 200. The channel-related information 451 may be appropriately changed by a category 441.

The information related to content data which is more fitted to the preference of the user may be transmitted by the server device 200 to the client device 100, for example. That is, the server device 200 may store, by the storage section 111, preference information associated with user identification information. In this case, the server device 200 can refer to preference information and can determine the content data which is more fitted to the preference of the user within the channel selected by the user.

In addition thereto, there are shown in FIG. 10 an "Add to" button 423, a "Like" button 421, a "Dislike" button 422, and the like. For example, in the case where the "Add to" button 423 is selected by the user, content identification information for identifying the content data currently being selected can be added to user-specific registration information. When new content identification information is added to the user-specific registration information, it becomes possible to download content data identified by the new content identification information to the client device 100, and to reproduce the content data.

Further, for example, when the "Like" button 421 is selected by the user, information related to the content data currently being selected can be reflected to the preference information held by the server device 200. In the same manner, for example, when the "Dislike" button 422 is selected by the user, information related to the content data currently being selected can be reflected to the preference information held by the server device 200. As the information related to the content data currently being selected, there is assumed a genre of the content data currently being selected, for example. In this way, when it becomes possible to update the preference information held by the server device 200, content data which is more fitted to the preference of the user can be suggested to the user.

[1-11. Screen Example (i) for Causing User to Purchase Content Data]

Figure 11:
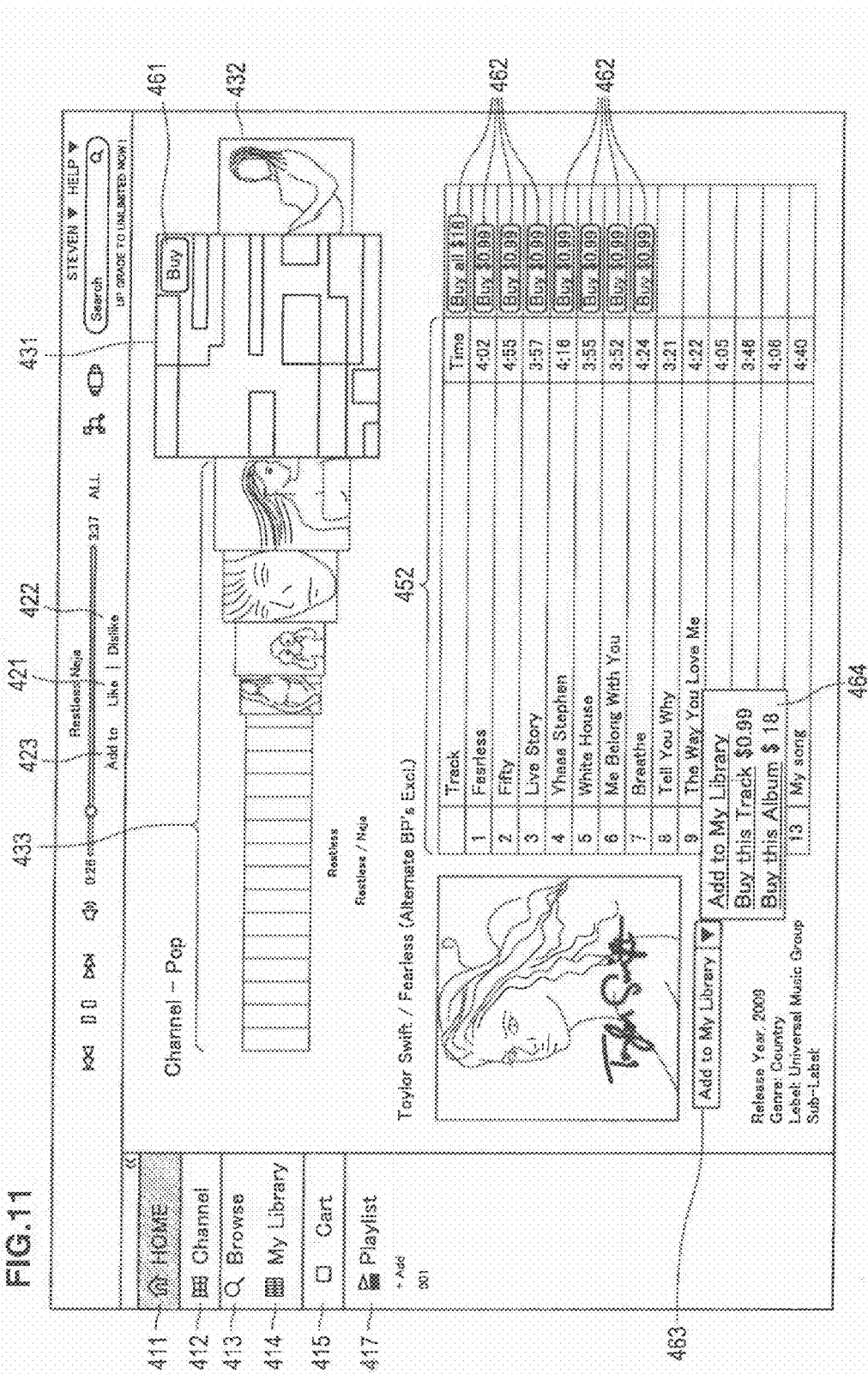
FIG. 11 is a diagram showing a screen example (i) in which objects are arranged, which are for causing a user to purchase content data that is not held by the client device according to the embodiment of the present invention.

FIG. 11 is a diagram showing a screen example (i) in which objects are arranged, which are for causing a user to purchase content data that is not held by the client device 100 according to the embodiment of the present invention. With reference to FIG. 11, there will be described the screen example (i) in which objects are arranged, which are for causing the user to purchase content data that is not held by the client device 100 according to the embodiment of the present invention.

The transmission section 113 transmits, to the server device 200, user identification information for identifying a user who uses the client device 100 by including the user identification information in an information transmission request. In this case, there are: a case where content identification information is registered in the user-specific registration information held by the server device 200 in association with the user identification information included in the information transmission request; and a case where the content identification information is not registered.

Consequently, for example, let us assume a case where, in the content-related information received by the reception section 114 from the server device 200, there is included information indicating that the content identification information is not registered in the user-specific registration information in association with the user identification information included in the information transmission request. In this case, the control section 112 may cause a predetermined display section to display the content-related information. Also, the control section 112 may cause the predetermined display section to display a predetermined object for causing the user to purchase the content data identified by the content identification information included in the information transmission request, in a corresponding manner to the content-related information.

In FIG. 11, in addition thereto, there are shown a "Cart" button 415, a "Playlist" button 417, content-related information 452, a purchase button 461 which is superimposed on the image 431, a purchase button 462 corresponding to the content-related information 452, a combo box 463, a selection list 464, and the like. The purchase button 461 superimposed on the image 431 is an example of the predetermined object for causing the user to purchase the content data identified by the content identification information included in the information transmission request. When a purchase button 462 is selected, the content data corresponding to the selected purchase button 462 is to be put into a cart.

The control section 112 may cause the "Cart" button 415 to be displayed only in the case where content data is put into the cart. In the case where the "Playlist" button 417 is selected, a playlist 416 registered in the server device 200 may be displayed as shown in FIG. 10. Further, for example, when the combo box 463 is selected by the user, the selection list 464 may be displayed, which includes a link for adding the content data currently being selected to the user-specific registration information, a link for purchasing the content data currently being selected, a link for purchasing an album that includes the content data currently being selected, and the like.

[1-12. Screen Example (ii) for Causing User to Purchase Content Data]

Figure 12:
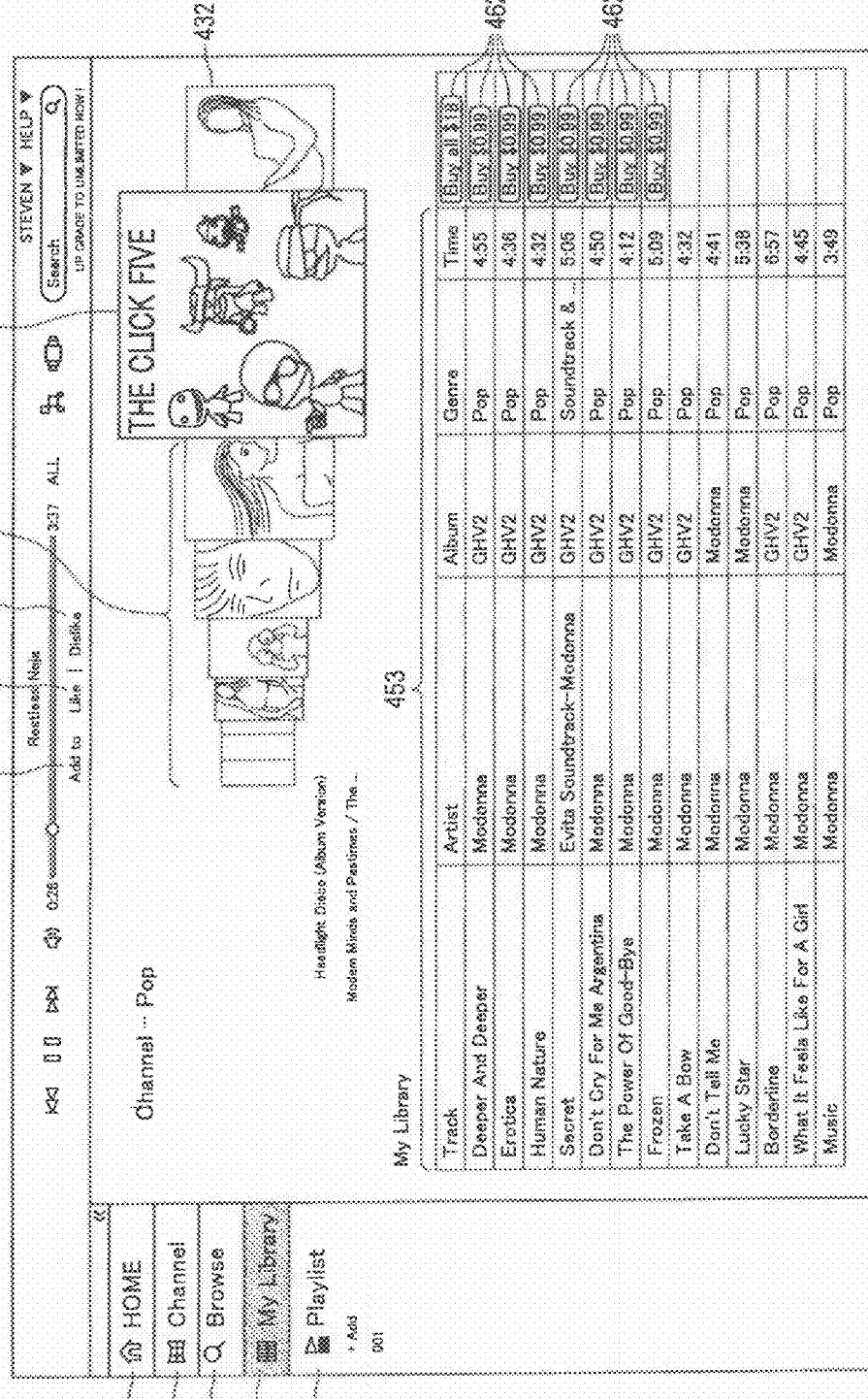
FIG. 12 is a diagram showing a screen example (ii) in which objects are arranged, which are for causing the user to purchase content data that is not held by the client device according to the embodiment of the present invention.

FIG. 12 is a diagram showing a screen example (ii) in which objects are arranged, which are for causing the user to purchase content data that is not held by the client device 100 according to the embodiment of the present invention. With reference to FIG. 12, there will be described the screen example (ii) in which objects are arranged, which are for causing the user to purchase content data that is not held by the client device 100 according to the embodiment of the present invention.

The client device 100 is also capable of acquiring and displaying user-specific registration information (My Library) which is registered in the server device 200. That is, the transmission section 113 transmits, to the server device 200, a registration information acquisition request including user identification information for identifying a user who uses the client device 100. In this case, the client device 100 further includes the reception section 114 which receives content-related information 453 as a response to the registration information acquisition request from the server device 200, the content-related information 453 being information related to content data identified by content identification information which is held by the server device 200 in association with the user identification information included in the registration information acquisition request in the user-specific registration information. Further, the control section 112 may cause a predetermined display section to display the content-related information 453 received by the reception section 124 from the server device 200.

The control section 112 does not, in principle, cause the predetermined display section to display information related to content data identified by content identification information which is not registered in the user-specific registration information. However, the control section 112 may cause the predetermined display section to display the information related to the content data identified by the content identification information which is not registered in the user-specific registration information.

That is, the reception section 114 may further receive content-related information as a response to the registration information acquisition request from the server device 200, the content-related information being the information related to the content data identified by the content identification information which is not held by the server device 200 in association with the user identification information in the user-specific registration information. In this case, the control section 112 may cause the predetermined display section to display the content-related information. Also, the control section 112 may cause the predetermined display section to display a predetermined object for causing the user to purchase the content data identified by the content identification information, in a corresponding manner to the content-related information.

In the case where the user makes a selection to reproduce the content data identified by the content identification information which is not held by the server device 200 in association with the user identification information in the user-specific registration information, the client device 100 may download only a part of the content data from the server device 200, and reproduce the part of the content data.

Accordingly, there is achieved an effect that the willingness to buy the content data is increased, for example.

Further, in the case where the user makes a selection to reproduce the content data identified by the content identification information which is not held by the server device 200 in association with the user identification information in the user-specific registration information, the client device 100 may reproduce, instead of downloading the content data from the server device 200 and reproducing the content data, content data held by the client device 100.

[1-13. Display Example of Content Data to be Purchased by User]

FIG. 13 is a diagram showing a display example of content data which is to be purchased by the user via the client device 100 according to the embodiment of the present invention. With reference to FIG. 13, there will be described the display example of content data which is to be purchased by the user via the client device 100 according to the embodiment of the present invention.

The control section 112 controls a display section in a manner that the display section displays the inside of the cart into which the content data to be purchased by the user is put based on predetermined operation input by the user via the input section 115, for example. The predetermined operation corresponds to, for example, operation that the "Cart" button 415 being selected. The display section is an example of the output section 116.

As shown in FIG. 13, the content-related information 452 is information related to the content data which is put into the cart. Further, as shown in FIG. 13, there may be displayed a "Check out" button 466 for calculating a total purchase amount of the content data corresponding to a tick box 465 with a tick mark.

[1-14. Processing Executed by First Client Device]

FIG. 14 is an example of a flowchart showing a flow of processing executed by the first client device 100A1 according to the embodiment of the present invention. With reference to FIG. 14, the flow of processing executed by the first client device 100A1 according to the embodiment of the present invention will be described.

As shown in FIG. 14, first, the control section 112 acquires content identification information for identifying content data stored in the storage section 111 (Step S101). The control section 112 acquires the content identification information for identifying content data stored in the storage section 111 based on predetermined operation input by a user via the input section 115, for example. The technique for the control section 112 to acquire the content identification information is not particularly limited as described above.

Subsequently, the transmission section 113 transmits, to the server device 200, a registration request including the content identification information acquired by the control section 112 and user identification information for identifying the user A who uses the first client device 100A1 (Step S102). The user identification information as used herein may be acquired from user identification information registered in the storage section 111 in advance, or may be acquired from user identification information input by the user A when the transmission section 113 transmits the registration request to the server device 200.

[1-15. Processing (i) Executed by Server Device]

FIG. 15 is an example of a flowchart showing a flow of processing (i) executed by the server device 200 according to the embodiment of the present invention. With reference to FIG. 15, the flow of processing (i) executed by the server device 200 according to the embodiment of the present invention will be described. Note that, the processing (i) executed by the server device 200 according to the embodiment of the present invention is executed after the processing shown in FIG. 14.

As shown in FIG. 15, first, the reception section 210 receives the registration request from the first client device 100A1 (Step S201). Subsequently, the control section 220 determines whether or not the storage section 240 stores content data identified by the content identification information included in the registration request (Step S202). In the case where the control section 220 determines that the storage section 240 does not store the content data identified by the content identification information included in the registration request ("No" in Step S203), the control section 220 does not proceed to Step S204 and terminates the processing.

In the case where the control section 220 determines that the storage section 240 stores the content data identified by the content identification information included in the registration request ("Yes" in Step S203), the control section 220 proceeds to Step S204. The storage section 240 stores information in which user identification information and content identification information, which are included in the registration request, are associated with each other as user-specific registration information (Step S204), and the control section 220 terminates the processing.

[1-16. Processing Executed by Second Client Device]

FIG. 16 is an example of a flowchart showing a flow of processing executed by the second client device 100A2 according to the embodiment of the present invention. With reference to FIG. 16, the flow of processing executed by the second client device 100A2 according to the embodiment of the present invention will be described.

As shown in FIG. 16, first, the control section 122 acquires content identification information designated by the user A who uses the second client device 100A2 as selection information (Step S301). For example, the control section 122 acquires the content identification information designated by the user A who uses the second client device 100A2 as the selection information based on predetermined operation input by the user via the input section 125.

Subsequently, the transmission section 123 transmits, to the server device 200, a content transmission request including the selection information acquired by the control section 122 and user identification information for identifying the user A who uses the second client device 100A2 (Step S302). The user identification information as used herein may be acquired from user identification information registered in the storage section 121 in advance, or may be acquired from user identification information input by the user A when the transmission section 123 transmits the content transmission request to the server device 200.

Subsequently, the reception section 124 receives, from the server device 200, content data as a response to the content transmission request transmitted by the transmission section 123 (Step S303). When the content data is received by the reception section 124, the reproduction section 127 can reproduce the content data received by the reception section 124 based on control performed by the control section 122, for example. The reproduction section 127 can stream-reproduce the content data received by the reception section 124, for example.

[1-17. Processing (ii) Executed by Server Device]

FIG. 17 is an example of a flowchart showing a flow of processing (ii) executed by the server device 200 according to the embodiment of the present invention. With reference to FIG. 17, the flow of processing (ii) executed by the server device 200 according to the embodiment of the present invention will be described.

As shown in FIG. 17, first, the reception section 210 receives the content transmission request from the second client device 100A2 (Step S401). Subsequently, the control section 220 determines whether or not the storage section 240 stores information in which the user identification information and the selection information, which are included in the content transmission request, are associated with each other as user-specific registration information (Step S402). In the case where the control section 220 determines that the storage section 240 does not store the information in which the user identification information and the selection information, which are included in the content transmission request, are associated with each other as the user-specific registration information ("No" in Step S403), the control section 220 does not proceed to Step S404 and terminates the processing.

In the case where the control section 220 determines that the storage section 240 stores the information in which the user identification information and the selection information, which are included in the content transmission request, are associated with each other as the user-specific registration information ("Yes" in Step S403), the control section 220 proceeds to Step S404. The transmission section 230 transmits, to the second client device 100A2, content data identified by the selection information as a response to the content transmission request (Step S404), and the control section 220 terminates the processing.

[1-18. Content Data-Purchase Processing Executed by Client Device]

FIG. 18 is an example of a flowchart showing a flow of content data-purchase processing executed by the client device 100 according to the embodiment of the present invention. With reference to FIG. 18, an example of a flowchart showing a flow of content data-purchase processing executed by the client device 100 according to the embodiment of the present invention will be described.

As shown in FIG. 18, first, the control section 112 accepts a choice of content data which is a subject of the purchase via the input section 415 (Step S501), and puts the content data into a cart (Step S502). The acceptance of the choice of the content data which is a subject of the purchase is realized by, in more detail, when operation of selecting a purchase button 462 is accepted via the input section 115, acquiring the content identification information corresponding to the purchase button 462. The processing of putting the content data into the cart is realized by, to be specific, registering content identification information for identifying the selected content data into a region for storing information to be purchased. The region for storing information to be purchased can be set in the storage section 111.

Subsequently, in the case where the control section 112 determines that operation of purchasing the content data put in the cart is performed ("Yes" in Step S503), the control section 112 displays a purchase amount of the content data put in the cart (Step S504), and, in the case where purchase operation at the purchase amount is performed ("Yes" in Step S505), the control section 112 performs purchase processing (Step S506) and terminates the processing. The operation of purchasing the content data put in the cart is realized by, in more detail, when operation of selecting the "Check out" button 466 is accepted via the input section 115, acquiring the content identification information corresponding to the tick box 465 with a tick mark.

Subsequently, in the case where the control section 112 determines that the operation of purchasing the content data put in the cart is not performed ("No" in Step S503) or in the case where the purchase operation at the purchase amount is not performed ("No" in Step S505), the control section 112 may return to Step S501, for example.

Note that it is also possible to perform setting in such a manner that the purchase confirmation in Step S503 and/or the purchase amount confirmation in Step S505 are/is omitted. In this case, the control section 112 may omit the processing from Step S502 to Step S505, and may proceed to Step S506 after Step S501 is executed.

[1-19. Example of Hardware Configuration of Server Device]

FIG. 19 is an example of a hardware configuration of the server device 200 according to the embodiment of the present invention. With reference to FIG. 19, an example of the hardware configuration of the server device 200 according to the embodiment of the present invention will be described.

As shown in FIG. 19, the server device 200 includes, for example, a CPU (Central Processing Unit) 901, a ROM (Read Only Memory) 902, a RAM (Random Access Memory) 903, a host bus 904, a bridge 905, an external bus 906, an interface 907, an input unit 908, an output unit 910, a storage unit (HDD) 911, a drive 912, a connection port 914, and a communication unit 915.

The CPU 901 functions as an arithmetic processing unit and a control unit, operates in accordance with various programs stored in the ROM 902 or the HDD 911, and controls respective sections inside the server device 200. Examples of specific processing to be executed include encoding and decoding processing of content data and input/output processing control of the content data and the like.

The ROM 902 stores a program used by the CPU 901, an arithmetic parameter, and the like. Further, the ROM 902 may have a function of saving content data and the like. The RAM 903 temporarily stores a program used to execute the CPU 901 and a parameter or the like that appropriately changes during execution of the CPU 901. The CPU 901, the ROM 902, and the RAM 903 are connected to each other by the host bus 904 which is configured from a CPU bus or the like.

The host bus 904 is connected to the external bus 906 such as a PCI (Peripheral Component Interconnect/Interface) bus via the bridge 905.

The input unit 908 is configured from, for example, an operation section such as a mouse, a keyboard, a touch panel, a button, a switch, and a lever, and an input control circuit for generating an input signal and outputting the input signal to the CPU 901. The user of the server device 200 can input various types of data to the server device 200 and can indicate processing operation to the server device 200, by operating the input unit 908.

The output unit 910 is configured from, for example, a display unit such as a CRT (Cathode Ray Tube) display device, a liquid crystal display (LCD) device, and a lamp, and an audio output unit such as a speaker. The output unit 910 outputs reproduced content data, for example. Specifically, the display unit displays reproduced video content in a form of a text or in a form of an image such as a moving image or a still image. On the other hand, the audio output unit pronounces reproduced audio content.

The HDD 911 is a unit for storing data, which is configured as an example of the storage section of the server device 200 according to the embodiment of the present invention. The HDD 911 stores a program executed by the CPU 901 and various types of data in the hard disk. Further, in the HDD 911, various types of data such as content data are stored, for example.

The drive 912 is a reader/writer for a storage medium, and is incorporated in or externally attached to the server device 200. The drive 912 records various types of data such as content data into a removable storage medium 40 and reproduces the recorded data. Examples of the drive 912 include a magnetic disk (such as an HD), an optical disk (such as a CD and a DVD), a magneto-optical disk (such as an MO), and a semiconductor memory, which are loaded into the server device 200.

Specifically, the drive 912 reads out data recorded in the removable storage medium 40, and supplies the RAM 903 with the data, which is connected to the drive 912 via the interface 907, the external bus 906, the bridge 905, and the host bus 904. The CPU 901 stores data in the ROM 902, the HDD 911, or the like as necessary. On the other hand, the drive 912 receives the data stored in the ROM 902, the HDD 911, or the like, data which is newly generated, and data acquired from an external device from the CPU 901, and writes the data in the removable storage medium 40.

The connection port 914 is, for example, a port for connecting the server device 200 with an external peripheral device, and has a connection terminal such as USB and IEEE1394. The connection port 914 is connected to the CPU 901 and the like via the interface 907 and the external bus 906, the bridge 905, the host bus 904, and the like.

The communication unit 915 is, for example, a communication interface configured from a communication device and the like to be connected to the network 300. The communication unit 915 transmits/receives various types of data such as content data and a control signal to/from an external apparatus such as the client device 100 via the network 300.

[1-20. Example of Hardware Configuration of Client Device]

FIG. 20 is an example of a hardware configuration of the client device 100 according to the embodiment of the present invention. With reference to FIG. 20, an example of the hardware configuration of the client device 100 according to the embodiment of the present invention will be described.

As shown in FIG. 20, the client device 100 includes, for example, a control unit 801, a flash memory 802, a RAM 803, a bus 806, an input unit 808, a display unit 810, an HDD 811, a drive 812, a decoder 813, a communication unit 815, an audio output circuit 816, a remote controller 818, and headphones 819.

The control unit 801 operates in accordance with various programs stored in the flash memory 802 or the HDD 811, and controls respective sections inside the client device 100, for example. The flash memory 802 stores a program that defines operation of the control unit 801 and various types of data, for example. The flash memory 802 can have a function of saving content data and the like. Further, the RAM 803 is configured from, for example, an SDRAM (Synchronous DRAM), and temporarily stores various types of data related to processing of the control unit 801.

The bus 806 is a data line for connecting the control unit 801, the flash memory 802, the RAM 803, the input unit 808, the display unit 810, the HDD 811, the drive 812, the decoder 813, the communication unit 815, the audio output circuit 816, and the like with each other.

The input unit 808 and the remote controller 818 are each configured from, for example, an operation section such as a touch panel, a button key, a lever, and a dial, and an input control circuit which generates an input signal in accordance with operation from a user to the operation section and outputs the input signal to the control unit 801. The user of the client device 100 can input various types of data to the client device 100 and can indicate processing operation to the client device 100 by operating the input unit 808 and the remote controller 818 which is to be described later.

The display unit 810 is configured from, for example, an LCD panel and an LCD control circuit. The display unit 810 displays various types of information in a form of a text or an image in accordance with control of the control unit 801.

The HDD 811 is a unit for storing data, which is configured as an example of the storage section of the client device 100 according to the embodiment of the present invention. The HDD 811 is configured from a hard disk drive (HDD) having a storage capacity of several tens of GBs, and stores content data, a program of the control unit 801, and various types of data. The client device 100 which includes the HDD 811 is configured as a content recording/reproducing device which is capable of recording and reproducing content data. Accordingly, it becomes possible that not only the content data supplied via the removable storage medium 40 but also the content data received from the server device 200 and the like is stored in the HDD 811 and is reproduced. However, the client device 100 is not limited to such an example, and the client device 100 may not include the HDD 811 and may be configured as a device dedicated to reproduction of content. In this case, for example, the client device 100 reads out content data saved in the removable storage medium 40 and is only capable of executing reproduction of the content data (incapable of recording the content data). Further, the client device 100 may not store the content data received from the server device 200 and the like in the HDD 811 and may sequentially stream-reproduce the content data.

The drive 812 is a reader/writer for a storage medium, and is incorporated in the client device 100. The drive 812 records various types of data such as content data into the various types of removable storage media 40 mentioned above which are loaded into the client device 100 and reproduces the recorded data. The decoder 813 performs decoding processing, surround processing, conversion processing into PCM data, of encoded content data.

The communication unit 815 transmits/receives various types of data such as content data to/from the server device 200 which is connected thereto via the network 300. In addition, the communication unit 815 may have functions of transmitting various requests to the server device via the network 300, and receiving responses with respect to the various requests from the server device 200 via the network 300, for example.

The audio output circuit 816 amplifies analog audio data which is decoded by the decoder 813 and DA converted by the control unit 801, and outputs the amplified analog audio data to the remote controller 818. The analog audio data is output from the remote controller 818 to the headphones 819, and is audio-output from a speaker (not shown) incorporated in the headphones 819.

<2. Modified Example>

It should be understood by those skilled in the art that various modifications, combinations, sub-combinations and alterations may occur depending on design requirements and other factors insofar as they are within the scope of the appended claims or the equivalents thereof.

<3. Summary>

According to the present embodiment, it is possible, in order to use the content data, which can be used by the first client device, by the second client device, to reduce the time and effort to upload the content data from the first client device to the server device.

What is claimed is:

1. A client device comprising:
storage circuitry which stores audio content data;
control circuitry which acquires content identification information for identifying the audio content data stored in the storage circuitry; and
transmission circuitry which transmits, to a server device, a registration request including user identification information for identifying a user who uses the client device and the content identification information acquired by the control circuitry, and which, when the server device holds the audio content data identified by the content identification information, causes the server device to associate the user identification information with the content identification information as user-specific registration information, wherein
when the server device does not hold the audio content data identified by the content identification information, the transmission circuitry causes the server device to hold the user-specific registration information, and also transmits the audio content data stored in the storage circuitry to the server device and causes the server device to hold the audio content data.

2. A client device comprising:
storage circuitry which stores audio content data;
control circuitry which acquires content identification information for identifying the audio content data stored in the storage circuitry; and
transmission circuitry which transmits, to a server device, a registration request including user identification information for identifying a user who uses the client device and the content identification information acquired by the control circuitry, and which, when the server device holds the audio content data identified by the content identification information, causes the server device to associate the user identification information with the content identification information as user-specific registration information, wherein,
when the server device does not hold the audio content data identified by the content identification information, the transmission circuitry causes the server device to be prohibited from holding the user-specific registration information.

3. The client device according to claim 1,
wherein the storage circuitry further stores a playlist obtained by arranging a plurality of pieces of content identification information in reproduction order,
wherein the control circuitry acquires the playlist stored in the storage circuitry, and
wherein the transmission circuitry further transmits the playlist to the server device, and causes the server device to hold a list, which is obtained by eliminating the content identification information that is not included in the user-specific registration information from the playlist, in association with the user identification information.

4. The client device according to claim 1,
wherein the storage circuitry further stores a playlist obtained by arranging a plurality of pieces of content identification information in reproduction order,
wherein the control circuitry acquires the playlist stored in the storage circuitry, and
wherein the transmission circuitry further transmits the playlist to the server device, and causes the server device to hold the playlist in association with the user identification information.

5. A client device comprising:
control circuitry which acquires content identification information designated by a user who uses the client device as selection information;
transmission circuitry which transmits, to a server device, a content transmission request including user identification information for identifying the user and the selection information acquired by the control circuitry, and which, when the server device associates the user identification information with the selection information as user-specific registration information, causes the server device to execute transmission of audio content data identified by the selection information as a response to the content transmission request; and
reception circuitry which receives the audio content data transmitted from the server device, wherein
when the server device does not hold the audio content data identified by the selection information, the transmission circuitry causes the server device to hold the user-specific registration information, and also transmits the audio content data identified by the selection information to the server device and causes the server device to hold the audio content data.

6. A client device comprising:
control circuitry which acquires content identification information designated by a user who uses the client device as selection information;
transmission circuitry which transmits, to a server device, a content transmission request including user identification information for identifying the user and the selection information acquired by the control circuitry, and which, when the server device associates the user identification information with the selection information as user-specific registration information, causes the server device to execute transmission of audio content data identified by the selection information as a response to the content transmission request; and
reception circuitry which receives the audio content data transmitted from the server device, wherein,
when the selection information is not held, as the content identification information, by the server device in association with the user identification information, the transmission circuitry causes the server device to be prohibited from transmitting the audio content data identified by the selection information.

7. The client device according to claim 5, further comprising
storage circuitry which stores audio content data,
wherein the control circuitry acquires content identification information for identifying the audio content data stored in the storage circuitry, and
wherein the transmission circuitry transmits, to the server device, a registration request including the user identification information and the content identification information acquired by the control circuitry, and when the server device holds the audio content data identified by the content identification information, the transmission circuitry causes the server device to associate the user identification information with the content identification information as the user-specific registration information.

8. The client device according to claim 7,
wherein the transmission circuitry transmits, to the server device, a registration request including the user identification information and the content identification information acquired by the control circuitry, and when the server device holds the audio content data identified by the content identification information, the transmission circuitry causes the server device to continuously hold the user-specific registration information, which has already been held by the server device, and also causes the server device to add information obtained by associating the user identification information with the content identification information to the user-specific registration information.

9. The client device according to claim 1 or 5,
wherein the transmission circuitry transmits, to the server device, an information transmission request which is a request for acquiring content-related information, which is information related to audio content data held by the server device,
wherein the client device further comprises reception circuitry which receives, from the server device, the content-related information as a response to the information transmission request, and
wherein the control circuitry causes predetermined display circuitry to display the content-related information received by the reception circuitry from the server device.

10. The client device according to claim 9,
wherein the transmission circuitry transmits, to the server device, user identification information for identifying a user who uses the client device by including the user identification information in the information transmission request, and
wherein, when, in the content-related information received by the reception circuitry from the server device, there is included information indicating that the content identification information is not registered in the user-specific registration information in association with the user identification information included in the information transmission request, the control circuitry causes the predetermined display circuitry to display the content-related information, and also causes the predetermined display circuitry to display a predetermined object for causing the user to purchase the audio content data identified by the content identification information, in a corresponding manner to the content-related information.

11. The client device according to claim 1 or 5,
wherein the transmission circuitry transmits, to the server device, a registration information acquisition request including user identification information for identifying a user who uses the client device,
wherein the client device further comprises reception circuitry which receives content-related information as a response to the registration information acquisition request from the server device, the content-related information being information related to audio content data identified by the content identification information which is held by the server device in association with the user identification information in the user-specific registration information, and
wherein the control circuitry causes predetermined display circuitry to display the content-related information received by the reception circuitry from the server device.

12. The client device according to claim 11,
wherein the reception circuitry further receives content-related information as a response to the registration information acquisition request from the server device, the content-related information being information related to audio content data identified by the content identification information which is not held by the server device in association with the user identification information in the user-specific registration information, and
wherein the control circuitry causes the predetermined display circuitry to display the content-related information, and also causes the predetermined display circuitry to display a predetermined object for causing the user to purchase the audio content data identified by the content identification information, in a corresponding manner to the content-related information.

13. An information processing method, comprising the steps of:
storing audio content data;
acquiring content identification information for identifying the audio content data;
transmitting, to a server device, a registration request including user identification information for identifying a user and the content identification information; and
causing, when the server device holds the audio content data identified by the content identification information, the server device to associate the user identification information with the content identification information as user-specific registration information, wherein
when the server device does not hold the audio content data identified by the content identification information, the causing causes the server device to hold the user-specific registration information, and also includes transmitting the stored audio content to the server device and causing the server device to hold the audio content data.

14. An information processing method, comprising the steps of:
acquiring content identification information designated by a user as selection information;
transmitting, to a server device, a content transmission request including user identification information for identifying the user and the selection information;
causing, when the server device holds information obtained by associating the user identification information with the selection information as user-specific registration information, the server device to execute transmission of audio content data identified by the selection information as a response to the content transmission request; and
receiving the content data transmitted from the server device, wherein
when the server device does not hold the audio content data identified by the selection information, the causing includes causing the server device to hold the user-specific registration information, and also transmitting the audio content data identified by the selection information to the server device and causing the server device to hold the audio content data.

15. An information processing system comprising:
a first client device which includes
storage circuitry which stores audio content data,
control circuitry which acquires content identification information for identifying the audio content data stored in the storage circuitry, and
transmission circuitry which transmits, to a server device, a registration request including user identification information for identifying a user who uses the first client device and the content identification information acquired by the control circuitry, and which, when the server device holds the audio content data identified by the content identification information, causes the server device to associate the user identification information with the content identification information as user-specific registration information; and a second client device which includes
control circuitry which acquires content identification information designated by the user as selection information,
transmission circuitry which transmits, to the server device, a content transmission request including user identification information for identifying the user and the selection information acquired by the control circuitry, and which, when the server device holds information obtained by associating the user identification information with the selection information as the user-specific registration information, causes the server device to execute transmission of audio content data identified by the selection information as a response to the content transmission request, and
reception circuitry which receives the content data transmitted from the server device, wherein
when the server device does not hold the audio content data identified by the content identification information, the transmission circuitry of the first client device causes the server device to hold the user-specific registration information, and also transmits the audio content data stored in the storage circuitry of the first client device to the server device and causes the server device to hold the audio content data.

16. An information processing system comprising:
a first client device;
a second client device; and
a server device,
wherein the first client device includes
storage circuitry which stores audio content data,
control circuitry which acquires content identification information for identifying the audio content data stored in the storage circuitry, and
transmission circuitry which transmits, to the server device, a registration request including user identification information for identifying a user who uses the first client device and the content identification information acquired by the control circuitry, wherein the server device includes
storage circuitry,
reception circuitry which receives the registration request from the first client device, and
control circuitry which, when the audio content data identified by the content identification information included in the registration request is stored in the storage circuitry, causes the storage circuitry to store associate the user identification information and the content identification information, which are included in the registration request, with each other as user-specific registration information,
wherein the second client device includes
control circuitry which acquires content identification information designated by the user as selection information, and
transmission circuitry which transmits, to the server device, a content transmission request including user identification information for identifying the user and the selection information acquired by the control circuitry,
wherein the reception circuitry of the server device receives the content transmission request from the second client device,
wherein, when information in which the user identification information and the selection information, which are included in the content transmission request, are associated with each other is stored in the storage circuitry as the user-specific registration information, the server device further includes transmission circuitry which transmits audio content data identified by the selection information as a response to the content transmission request to the second client device,
wherein the second client device further includes reception circuitry which receives the content data transmitted from the server device, and
when the server device does not hold the audio content data identified by the content identification information, the transmission circuitry of the first client device causes the server device to hold the user-specific registration information, and also transmits the audio content data stored in the storage circuitry of the first client device to the server device and causes the server device to hold the audio content data.

* * * * *